(12) United States Patent
St. Pierre et al.

(10) Patent No.: US 11,431,589 B2
(45) Date of Patent: Aug. 30, 2022

(54) DYNAMIC RUNTIME OPTIMIZATION OF LOGICAL EXPRESSIONS FOR PROCESSING INFORMATION

(71) Applicant: Arbor Networks, Inc., Westford, MA (US)

(72) Inventors: Brian St. Pierre, Acworth, NH (US); Peter Allen Jensen, Ellijay, GA (US); Timothy David Dodd, Auburn, GA (US)

(73) Assignee: Arbor Networks, Inc., Westford, MA (US)

( * ) Notice: Subject to any disclaimer, the term of this patent is extended or adjusted under 35 U.S.C. 154(b) by 85 days.

(21) Appl. No.: 16/663,056

(22) Filed: Oct. 24, 2019

(65) Prior Publication Data

US 2021/0126841 A1 Apr. 29, 2021

(51) Int. Cl.
*H04L 43/028* (2022.01)
*G06F 17/18* (2006.01)
*H04L 43/045* (2022.01)
*G06F 9/455* (2018.01)
*G06F 8/41* (2018.01)

(52) U.S. Cl.
CPC ............ *H04L 43/028* (2013.01); *G06F 8/443* (2013.01); *G06F 9/45516* (2013.01); *G06F 17/18* (2013.01); *H04L 43/045* (2013.01)

(58) Field of Classification Search
CPC ..... H04L 43/028; H04L 43/045; G06F 17/18; G06F 16/2453
See application file for complete search history.

(56) References Cited

U.S. PATENT DOCUMENTS

| 10,007,699 | B2 * | 6/2018 | Pangeni | G06F 16/24545 |
| 2003/0023645 | A1 * | 1/2003 | Walster | G06F 17/10 708/6 |
| 2004/0266442 | A1 * | 12/2004 | Flanagan | H04W 16/18 455/445 |
| 2006/0026116 | A1 * | 2/2006 | Day | G06F 16/24547 |
| 2020/0084118 | A1 * | 3/2020 | Gudipati | H04L 43/028 |

* cited by examiner

*Primary Examiner* — David R Lazaro
*Assistant Examiner* — Xiang Yu
(74) *Attorney, Agent, or Firm* — Locke Lord LLP; Scott D. Wofsy; Christopher J. Capelli

(57) ABSTRACT

A logical expression engine and computer-implemented method for optimizing evaluation of a logical expression is provided. The method includes receiving an original logical expression to be applied by a computer program for processing input information, the original logical expression having at least one operator and a subexpression disposed on each side of a related operator of the at least one related operator. The method further includes receiving statistics accumulated about how the computer program applies the subexpressions of the original logical expression for processing the input information received by the computer program, using the accumulated statistics to optimize the order in which the subexpressions would be applied by the computer program, and outputting for application by the computer program an optimized logical expression having the subexpressions ordered in accordance with the optimized order.

19 Claims, 25 Drawing Sheets p_true
Input: an AST node *n*
Output: the probability (0.0 to 1.0) that when *n*
  is evaluated, it will yield a value of *true* p_false
Input: an AST node *n*
Output: the probability (0.0 to 1.0) that when *n*
  is evaluated, it will yield a value of *false* compute_weighted_cost
Input: an AST node *n*, *n*'s parent node type *t*
Output: *n*'s weighted cost is computed and updated traverse_inorder
Input: an AST node *n*, and a callback function *cb*
Output: depends upon callback actions swap_children
Input: an AST node *n*
Output: *n*'s left & right children are swapped
 *n* and all of its children have their *recomputed* flags
 set to *false*

1780 n ↓

1782
tmp=n.left
n.left=n.right
n.right=tmp
traverse_inorder(n,reset_recomputed_cb)

reset_counts_cb
Input: an AST node *n*
Output: *n*'s evals and true counts are set to 0 and its *recomputed*
 flag is set to *false*

1790 n ↓

1792
n.evals=0
n.true=0
n.recomputed=false

FIG. 17E

DYNAMIC RUNTIME OPTIMIZATION OF LOGICAL EXPRESSIONS FOR PROCESSING INFORMATION

FIELD OF THE INVENTION

The present technology relates to logical expression optimization, and more particularly to dynamic runtime optimization of logical expressions for processing information.

BACKGROUND

Programming languages allow for the specification of logical expressions that can be evaluated when a program executes. The logical expressions can be used to process information by identifying patterns in the information and making decisions based on the identified patterns.

A logical expression is any expression that yields a value of true or false when evaluated. A logical expression may be represented by an abstract syntax tree (AST). ASTs are used in compilers and interpreters to process logical expressions and other language elements. ASTs are evaluated by performing an in-order, recursive traversal.

When a compiler processes an AST representation of a program, the compiler generates machine code that, when executed, will evaluate the logical expressions represented. The generated machine code is static and immutable. As a result, the expressions are evaluated in the order specified in the program.

Such conventional methods and systems have generally been considered satisfactory for their intended purpose. However, there is still a need in the art for a method to provide dynamic optimization of logical expressions in a program, while the program is being executed, for processing information.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for optimizing evaluation of a logical expression. The method includes receiving an original logical expression to be applied by a computer program for processing input information, the original logical expression having at least one operator and a subexpression disposed on each side of a related operator of the at least one related operator. The method further includes receiving statistics accumulated about how the computer program applies the subexpressions of the original logical expression for processing the input information received by the computer program, using the accumulated statistics to optimize the order in which the subexpressions would be applied by the computer program, and outputting for application by the computer program an optimized logical expression having the subexpressions ordered in accordance with the optimized order. In accordance with still another aspect of the disclosure, a logical expression engine for optimizing evaluation of a logical expression is provided. The logical expression engine includes a memory configured to store instructions and a processor disposed in communication with the memory. Upon execution of the instructions, the processor is configured to receive an original logical expression to be applied by a computer program for processing input information, the original logical expression having at least one operator and a subexpression disposed on each side of a related operator of the at least one related operator. The processor is further configured to receive statistics accumulated about how the computer program applies the subexpressions of the original logical expression for processing the input information received by the computer program, use the accumulated statistics to optimize the order in which the subexpressions would be applied by the computer program, and output for application by the computer program an optimized logical expression having the subexpressions ordered in accordance with the optimized order.

In a further aspect of the disclosure, a computer-implemented method is provided for analyzing evaluation of a logical expression. The method includes receiving input information and determining a plurality of subexpressions included in an original logical expression to be applied for processing the input information, the original logical expression having at least one operator and a subexpression disposed on each side of a related operator of the at least one related operator. The method further includes applying an original logical expression to an application for processing the input information, accumulating statistics about how the application applies the subexpressions of the original logical expression for processing the input information, submitting the statistics and the original expression to an optimizer for generation of an optimized logical expression that is an optimization of the original expression as a function of the statistics, and applying the optimized logical expression to the input information.

BRIEF DESCRIPTION OF THE DRAWINGS

The accompanying appendices and/or drawings illustrate various non-limiting, example, inventive aspects in accordance with the present disclosure.

DETAILED DESCRIPTION

A method and system is disclosed that provides dynamic optimization of logical expressions in a program that processes information. The optimization can be performed while the program is being executed (also referred to as runtime). An abstract syntax tree (AST) that represents a logical expression is applied to the information during runtime. An order of evaluation of subexpressions included in the logical expression can be adjusted as a function of statistics associated with evaluation of the subexpressions as the program is executed. This adjustment optimizes evaluation of the logical expression, which can improve performance of the program and increase efficiency of and capacity for processing the information.

Figure 1:
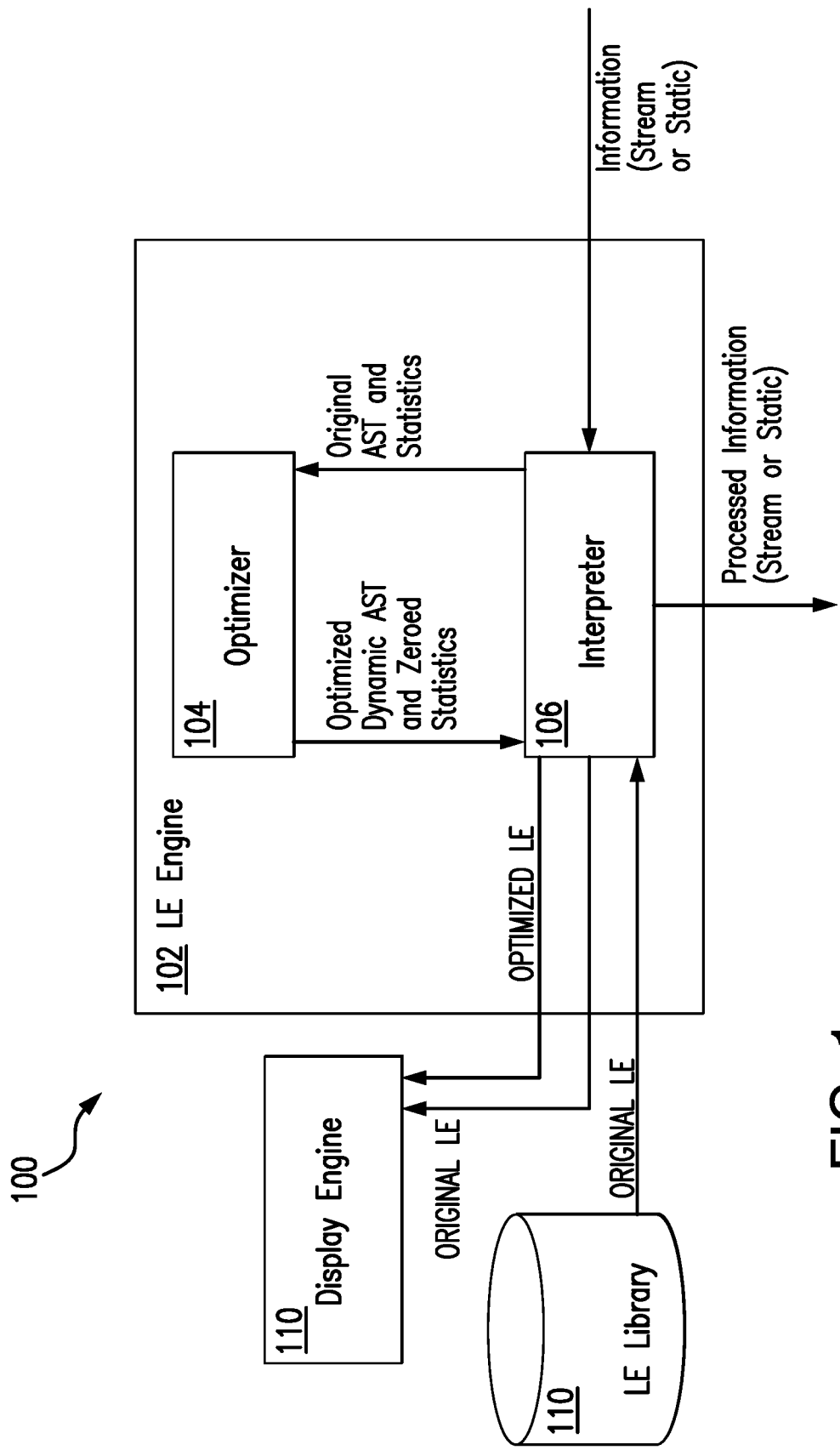
FIG. 1 illustrates a block diagram of an example information processing system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of an information processing system in accordance with the disclosure is shown in FIG. 1 and is designated generally by reference character 100. Other embodiments of the information processing system 100 in accordance with the disclosure, or aspects thereof, are provided in FIGS. 2-18, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Information processing system 100 includes a logical expression (LE) engine 102 that includes an optimizer 104 and an interpreter 106. The interpreter 106 receives information to be processed from an information source (not shown). The information can be received as a stream or as one or more static batches. The information can be, for example and without limitation, network traffic of a network, system log data of a system that logs data, or information from one or more data repositories (databases, libraries, etc.) to be searched. The information can include one or more of text, images, audio, video, numeric data, graphical data, or any other data that can be searched by a logical expression.

The interpreter 106 further receives a selected logical expression from a logical expression library 108, or alternatively a default logical expression can be received. The received logical expression, referred to as an original logical expression, is applied to the information. The interpreter 106 accumulates statistics from application of the original logical expression to the information. The selected logical expression and/or optimized logical expression can be provided to a display engine 110.

The interpreter 106 includes a computer program that can compile a logical expression into an AST. The interpreter 106 invokes optimization by providing an AST representation of the original logical expression (also referred to as the original AST) together with the statistics to the optimizer 104. Invocation of optimization can be periodical or in response to a condition.

The optimizer 104 optimizes the original AST as a function of the statistics and returns an optimized AST to the interpreter 106. The optimized LST can be returned without statistics or with a set of statistics that have null values (also referred to as zeroed statistics).

The interpreter 106 receives the optimized AST and processes the information by applying an optimized logical expression represented by the optimized AST to the information. The processed information can be output to a destination (not shown). The information can be received by the interpreter 106 as a stream or as two or more batches. Since the optimizer 104 optimizes the original AST as a function of the statistics, as the information changes over time (while streaming or from batch-to-batch), the statistics can change, causing the optimized AST and output by the optimizer 104 to be updated. The dynamic nature of the optimized AST can be viewed by providing the corresponding optimized logical expression to the display engine 110 for display. Once displayed, a user can visually detect how the logical expression changes as it is optimized. The displayed original logical expression can be compared by a viewer with the displayed optimized logical expression.

Since the interpreter 106 processes the information as a function of the dynamically changing optimized logical expression, the processing of the information is also updated over time, namely as an improvement in efficiency, speed, and resource usage cost.

In applications, logical expressions may be applied to data comprising the input for any domain of application programming. Examples include data from sensors monitoring real-time processes such as those in automated factories, flight-control systems in aircraft, or GPS navigation systems. Actions can be triggered by applying logical expressions to input data depending on a problem domain. For real-time process control, the actions can be a response to a detected conditions. An example of a detected condition in an example problem domain is an oven that is too hot or too cold. Example of an action that can be triggered in some other problem domains include adjustment of pitch/yaw/roll, modification of a recommended route, etc.

In an example application, the logical expression (original and/or optimized) is applied to the information by the interpreter 106 for processing the information by filtering the information for malicious or unwanted network traffic. When the information is streaming network traffic, for example, the interpreter 106 can filter the network traffic in real time by applying the logical expression. As the logical expression is optimized dynamically over time, the filtering is also optimized, such as for efficiency and capacity.

Figure 2:
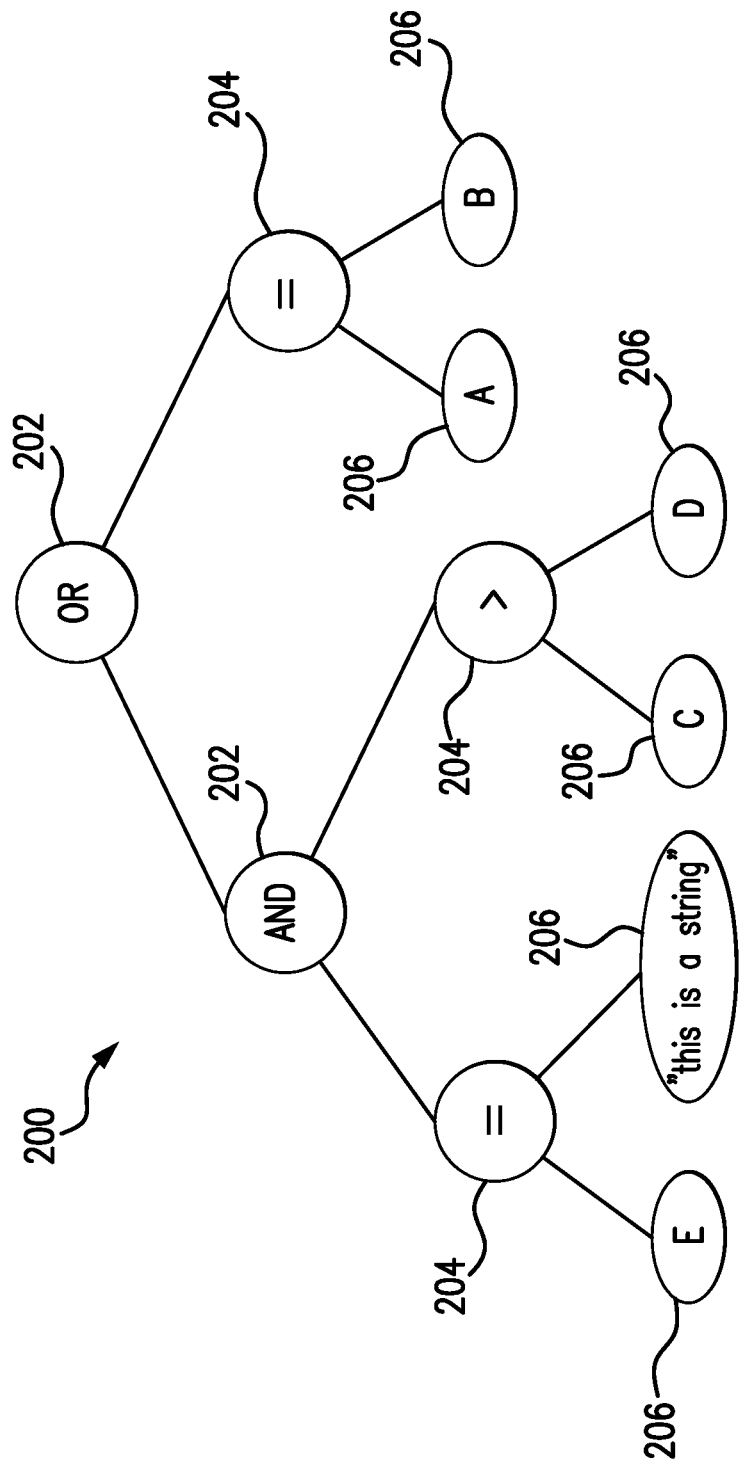
FIG. 2 illustrates a representation of an abstract syntax tree (AST) used by a logical expression engine of the information processing system shown in FIG. 1 to process an example logical expression.

FIG. 2 shows a tree diagram of an example AST 200. As shown, AST 200 includes three different node types:

A logical node 202 represents a logical operation, such as AND or OR operations, represented using a circle.
   A comparison node 204 represents a comparison operation (greater than, less than, equal to, etc.), represented using a circle.
   A leaf node 206 (represented using an oval) represents elemental operands of the logical expression. FIG. 2 shows AST 200 representing expression E="this is a string" AND C>D OR A=B.

ASTs are evaluated by performing an in-order traversal in which nodes are recursively visited by visiting a node's left child, then the node itself, then the node's right child. Traversal of AST 200 yields an evaluation of the expression as written.

Figure 3:
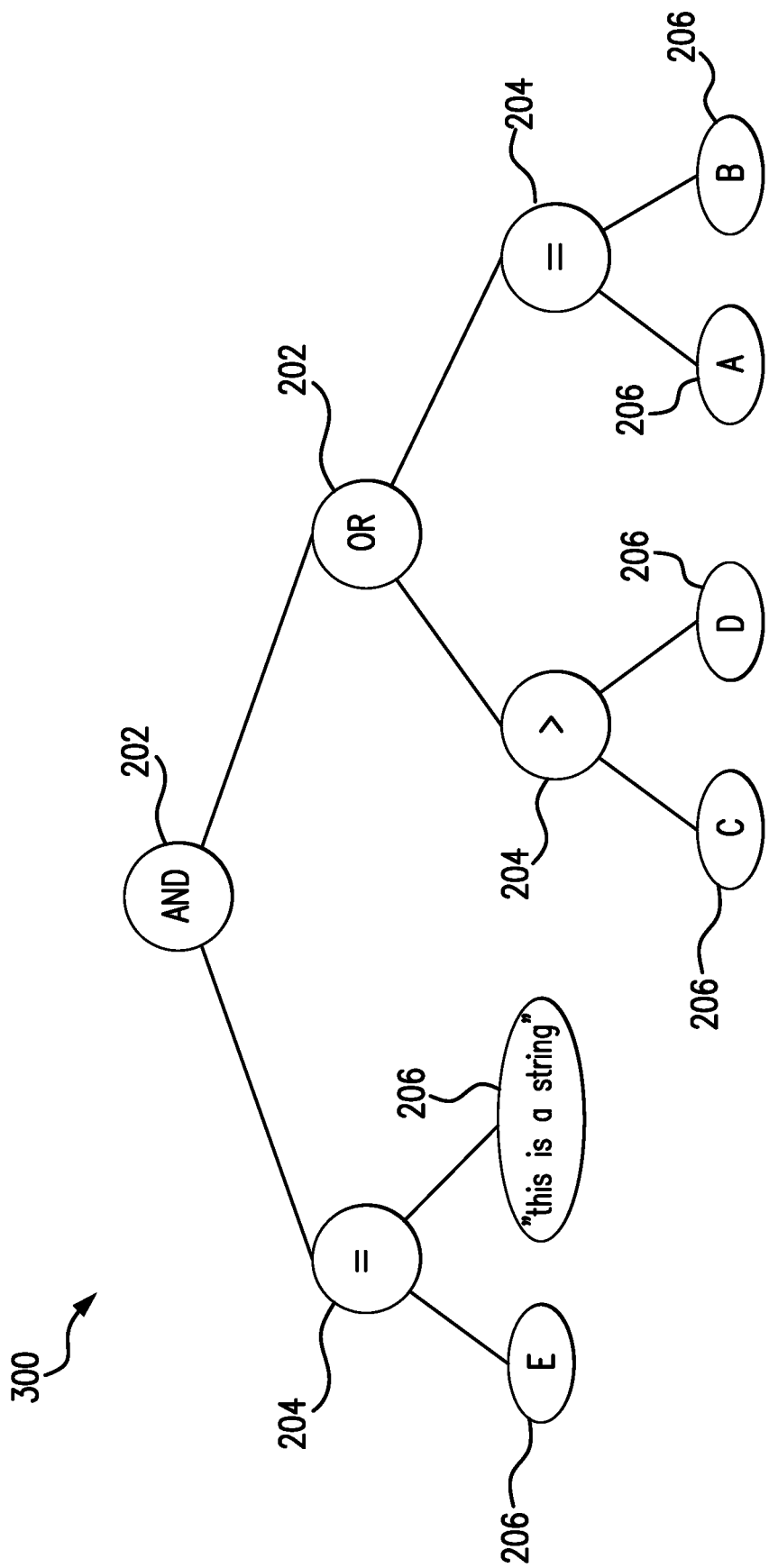
FIG. 3 illustrates a representation of another AST used by the logical expression engine to process a variation of the example logical expression associated with FIG. 2.

FIG. 3 shows a tree diagram of an example AST 300 that represents the same logical expression with parentheses added as follows: E="this is a string" AND (C>D OR A=B), which alters semantics of the original expression represented by AST 200 in FIG. 2. The computer program that represents the AST 200 in FIG. 2 would need to be altered by changing the computer program to represent AST 300.

Were the AST to be evaluated using a compiler, the compiler would process the computer program having the AST by generating static machine code that is immutable. The generated program would evaluate the logical expression in exactly the order as specified by the original logical expression.

On the other hand, interpreter 106 processes the AST itself by applying the AST to the information received by the interpreter 106 as it is updated over time, e.g., at run time. This allows for the possibility of changing the order of subexpression evaluation based on short-circuit evaluation (described below) to achieve more efficient execution, wherein a subexpression includes one operator and the operand(s) to be operated on by the operator.

Short-Circuit Evaluation

The interpreter 106 can perform short-circuit evaluation of the received logical expressions. Short-circuit evaluation is based on two observations:

1. For an OR expression, if the first term in the expression is true, the second term need not be evaluated. For example, in the expression A OR B, if A is true, B need not be evaluated to know that the whole expression is true.

2. For an AND expression, if the first term in the expression is false, the second term need not be evaluated. For example, in the expression A AND B, if A is false, B need not be evaluated to know that the whole expression is false.

While short-circuit evaluation could be used to write logical expressions so that the order of subexpressions optimize the runtime performance during evaluation, once a program is written, in many circumstances it is not possible to anticipate which subexpressions are more likely to be true or false at run time. What is more, for compiled programming languages, once an expression is written and translated into executable machine code, the order in which subexpressions are evaluated is static and unalterable. The result could be suboptimal performance at runtime performance.

However, interpreter 106 can use interpreted languages or table-driven programs that allow adjustments at run time. This allows a dynamic, optimized logical expression that is optimized over time based on statistics accumulated from information as it is received to be applied to the information at run time.

Principles of Dynamic Optimization

The optimizer 104 performs dynamic optimization of the order in which logical subexpressions are evaluated using the following operations:

For each subexpression, keep a running count of the number of times the expression has been evaluated and the number of times it yielded a value of true.
   Periodically resort the subexpressions so that for OR expressions, subexpressions that are more likely to be true are evaluated first; for AND expressions, subexpressions that are more likely to be false are evaluated first.

This method of reordering subexpressions improves runtime performance, however further optimization is possible by taking cost into consideration. Considering AST 200 in FIG. 2, it may be true that the AND subexpression represented by the left child node is equally or more likely to be true than the A=B subexpression of the right child node. However, the AND expression is also costlier to evaluate: if E="this is a string" is true, then both of the AND child nodes are evaluated. Furthermore, the string comparison E="this is a string" is more expensive computationally to evaluate than a simple numeric comparison. If the AND expression is false, then the OR's right child node is evaluated as well.

Ignoring the greater cost of the string comparison and counting the cost of evaluating a single elemental subexpression as 1, Table 1 summarizes the number of comparisons performed for all cases with the evaluation order (E="this is a string" AND C>D) OR A=B. The column headers represent the truth values ('T' for true and 'F' for false) for each subexpression, in order. Table 2 shows the same values for the alternative evaluation order A=B OR (E="this is a string" AND C>D).

Since there are three expressions to evaluate, there are $2^3=8$ possible cases. The table element for each case indicates the number of comparisons needed to determine the value of the whole expression. For example, in Table 1, the total number of comparisons for all eight cases is 18. Dividing by 8 gives us an average cost of 2.25. (In these tables it is assumed that each of the eight cases are equally likely.)

TABLE 1 average cost for original evaluation order
(E = "this is a string" AND C > D) OR A = B

|      | FFF | FFT | FTF | FTT | TFF | TFT | TTF | TTT |
|------|-----|-----|-----|-----|-----|-----|-----|-----|
| cost | 2   | 2   | 2   | 2   | 3   | 3   | 2   | 2   |

Average cost = 18/8 = 2.25

TABLE 2 average cost for evaluation order swapping left & right branches
A = B OR (E = "this is a string" AND C > D)

|      | FFF | FFT | FTF | FTT | TFF | TFT | TTF | TTT |
|------|-----|-----|-----|-----|-----|-----|-----|-----|
| cost | 2   | 2   | 3   | 3   | 1   | 1   | 1   | 1   |

Average cost = 14/8 = 1.75

Tables 1 and 2 assume a random distribution across the truth-value cases, so the computed averages are unweighted. These tables demonstrate that for optimal performance, there are advantages to accounting for cost of evaluating a subexpression as well as its probability of enabling short-circuit evaluation.

The Cost of a Comparison

Let S be a simple comparison expression like A=B. The cost of evaluating S is denoted as C(S). For simple numeric comparison, a cost value of 1 is assigned. For more complex comparisons, higher values could be assigned. For example, for a string comparison the number of characters compared could be assigned as the cost of the comparison operation. However, associated challenges arise, such as:

The number of characters compared typically varies. Adding logic to keep track of this at run time and dynamically computing an average cost adds to the expense of the optimization.

The number of characters actually compared at run time will be the number of characters in the shorter of the two strings. Again, accounting for this would require keeping track of comparison lengths at run time, which would be expensive.

Assigning the cost of a string comparison as the average number of characters compared may not be an accurate reflection of the actual cost of such an operation relative to simple numeric comparisons.

Due to these challenges, the example method assigns a static value of 2 as the cost for string comparisons, leaving the cost of numeric comparisons as 1. Table 3 shows this approach, including recomputed cost values for the original evaluation order from Table 1. Factoring in the cost of a comparison, Table 4 shows an AST 400 in which left and right branches of the AND node are swapped so that the less expensive C>D comparison is performed first.

TABLE 3 recomputing average cost for original evaluation order
(E = "this is a string" AND C > D) OR A = B

|      | FFF | FFT | FTF | FTT | TFF | TFT | TTF | TTT |
|------|-----|-----|-----|-----|-----|-----|-----|-----|
| cost | 3   | 3   | 3   | 3   | 4   | 4   | 3   | 3   |

Average cost = 26/8 = 3.25

TABLE 4 recomputing average cost for resorted evaluation order
A = B OR (C > D AND E = "this is a string")

|      | FFF | FFT | FTF | FTT | TFF | TFT | TTF | TTT |
|------|-----|-----|-----|-----|-----|-----|-----|-----|
| cost | 2   | 2   | 4   | 4   | 1   | 1   | 1   | 1   |

Average cost = 16/8 = 2.00

This exercise shows that when string comparisons are weighted more heavily than numeric comparisons, the performance gains for reordering subexpression evaluation are likely to be even greater.

The Cost of a Logical Expression

While the cost of evaluating a comparison expression does not change with the order in which expressions are evaluated, the ordering of AND OR subexpressions can have a significant impact on the cost of evaluating them. To reorder these subexpressions in an optimal manner, a means is used for computing and comparing their costs.

The cost C of a logical expression L is denoted C(L). The basic notion of cost has to do with the expense of evaluating each child node in the AST representation of L. Once the left child node is evaluated, the outcome of that operation determines whether or not there is a need to evaluate the right child node. Therefore, the cost of a logical operation is defined as the cost of evaluating the left child node plus the cost of evaluating the right child node multiplied by the probability of a need to evaluate the right child node.

Notations used:

The probability of any logical or comparison expression E evaluating as true is $P_t(E)$.

The probability of any logical or comparison expression E evaluating as false is $P_f(E)$.

The probability of any logical or comparison expression enabling short-circuit evaluation of its parent expression is $P_{sc}(E)$. If the parent logical operator is AND, then $P_{sc}(E)=P_f(E)$. For OR expressions, $P_{sc}(E)=P_t(E)$. (Note that the probability of an expression not enabling short-circuit evaluation is $1-P_{sc}(E)$).

Let L be an AST root node of a logical expression with left and right child nodes L.left and L.right. Then the cost of L is $C(L)=C(L.left)+(1-P_{sc}(L.left))\times C(L.right)$.

The Weighted Cost of a Logical Expression

The weighted cost WC of a logical expression L is a function of:

The probability that L, when evaluated, enables short-circuit evaluation of its parent expression.

The cost of evaluating L.

Therefore the weighted cost of L is defined as $WC(L)=C(L)\times(1-P_{sc}(L))$. This definition has two desirable properties:

For two expressions $L_1$ and $L_2$ such that $C(L_1)=C(L_2)$, the expression that is less likely to enable short-circuit evaluation will have the larger weighted cost.

For two expressions $L_1$ and $L_2$ such that $P_{sc}(L_1)=P_{sc}(L_2)$, the expression that is more expensive to evaluate will have the larger weighted cost.

In the example from FIG. 2 above, the expression (E="this is a string" AND C>D) is designated as expression $E_1$. A=B is expression $E_2$. $C(E_1)$ would be computed as $C(E="this is a string")+(1-P_{sc}(E="this is a string"))\times C(C>D)$. Therefore, $WC(E_1)=C(E_1)\times(1-P_{sc}(E_1))$.

Figure 4:
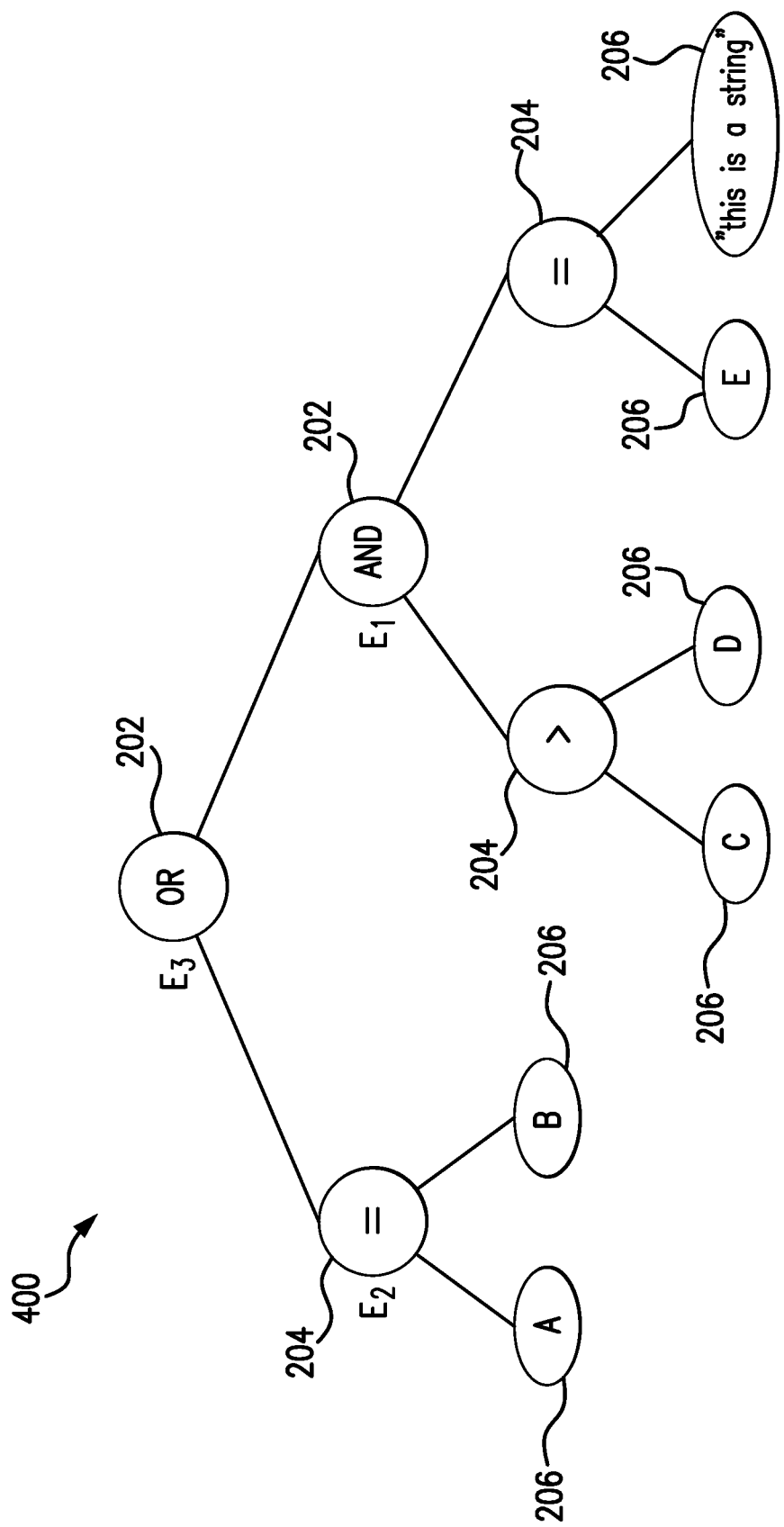
FIG. 4 illustrates a representation of still another AST used by the logical expression engine to process another variation of the example logical expression associated with FIG. 2.

With reference to FIG. 4 and example AST 400, using the cost assignments from Tables 3 and 4, namely a cost value=1 for numeric comparisons and a cost value=2 for string comparisons, $WC(E_1)=2+p\times C(C>D)$. Meanwhile, $WC(E_2)=(E_2)\times(1-p)=1-p$. Since $WC(E_1)>WC(E_2)$, the AST 200 is reordered by swapping the left and right branches. Note that the branches of the AND node are also swapped so that the less expensive C>D expression is evaluated first. The result is shown in FIG. 4 as an optimized AST 400.

Optimizing Traversals and Tree Structure

Figure 5:
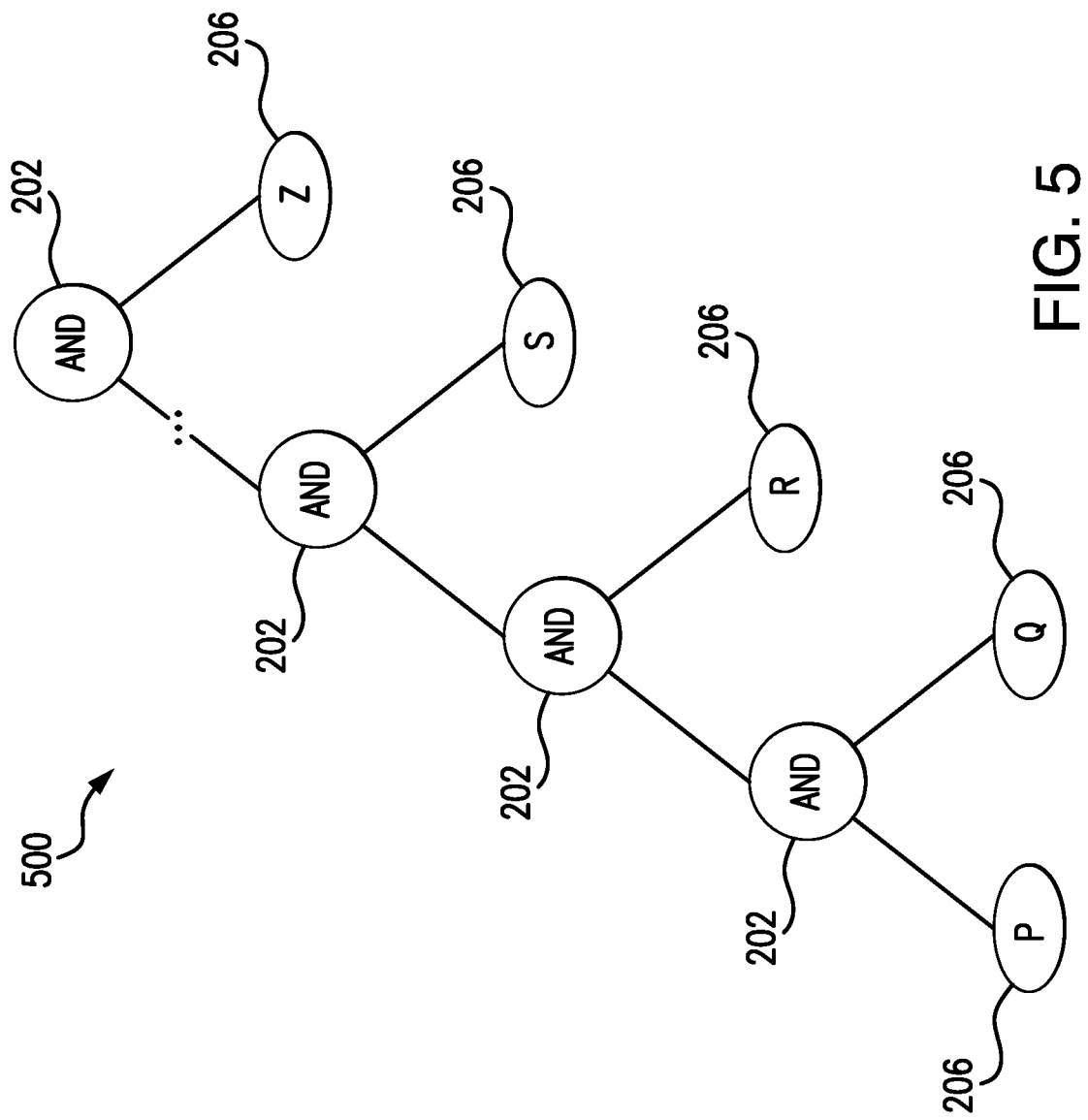
FIG. 5 illustrates a representation of still another AST used by the logical expression engine of the information processing system shown in FIG. 1 to process another example logical expression.
Figure 6:
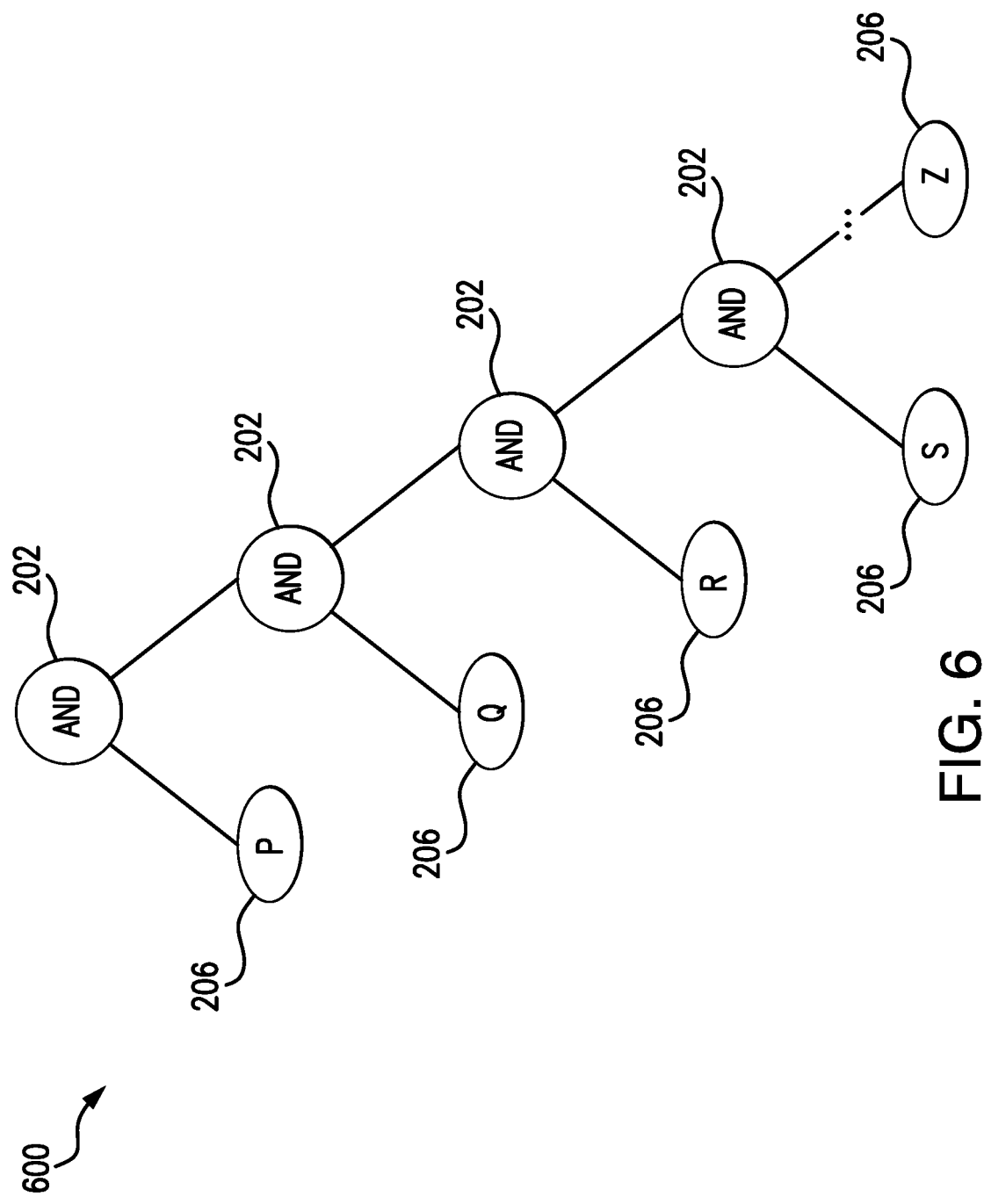
FIG. 6 illustrates a representation of still another AST used by the logical expression engine that is a logical equivalent of the fourth AST shown in FIG. 5.
Figure 7:
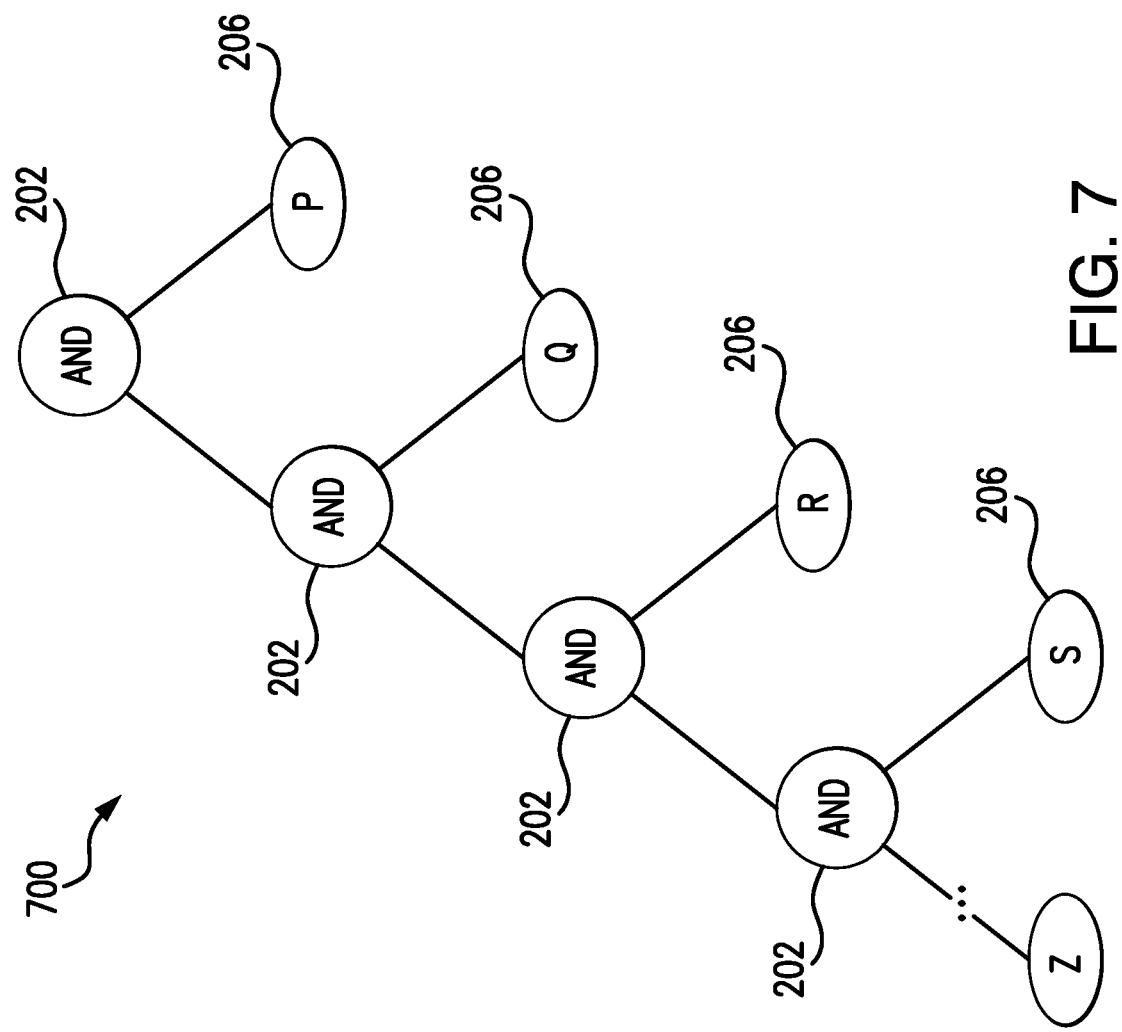
FIG. 7 illustrates a representation of still another AST used by the logical expression engine that is another logical equivalent of the fourth AST shown in FIG. 5.

With reference to FIGS. 5-7, tree diagrams of respective example ASTs 500-700 are shown. It is assumed for ASTs 500-700 that all of the comparison operations in the example expression have an equal probability p of being true.

With reference to FIG. 5, suppose that an example AST 500 has been sorted for optimal performance, wherein leaf node 202 P (P) is the least costly and leaf node 202 Z (Z) the most expensive. Using a traditional in-order traversal, P will be the first node evaluated. However, with this tree structure, many nodes are traversed just to get to P.

With reference to FIG. 6, as long as a traditional in-order traversal is used, example AST 600, which is logically equivalent to AST 500 (shown in FIG. 5), can be evaluated at improved cost relative to AST 500. In AST 600, node P is evaluated first. Furthermore, node P is also immediately accessible via a root node 602. While logically equivalent, the structure of AST 600 is now different than the structure of AST 500. Sorting and evaluations of AST 600 use left in-order traversal.

With reference to FIG. 7, an alternative AST 700 is shown in which the tree structure of example AST 500 shown in FIG. 5 is preserved, however a right in-order traversal is performed when sorting and evaluating AST 700. AST 700 represents same logical expression as that of as AST 500, but reordered such that a right in-order traversal is the most efficient means of evaluating the expression.

While both ASTs 600 and 700 can yield a quicker runtime evaluation of the same expression, the disclosed method is in accordance with FIG. 6, which changes AST 600's structure and uses use left in-order traversal.

Reordering an AST

Reordering an AST consists of two operations:
1. Sort the comparison nodes.
2. Rewrite the tree.

First, a simple case of a homogeneous tree is considered in which all the logical operators of the AST are of the same type. In other words, the expression is of the form A OR B OR C OR . . . K, or A AND B AND C AND . . . K.

Reordering Homogeneous Trees

Figure 8:
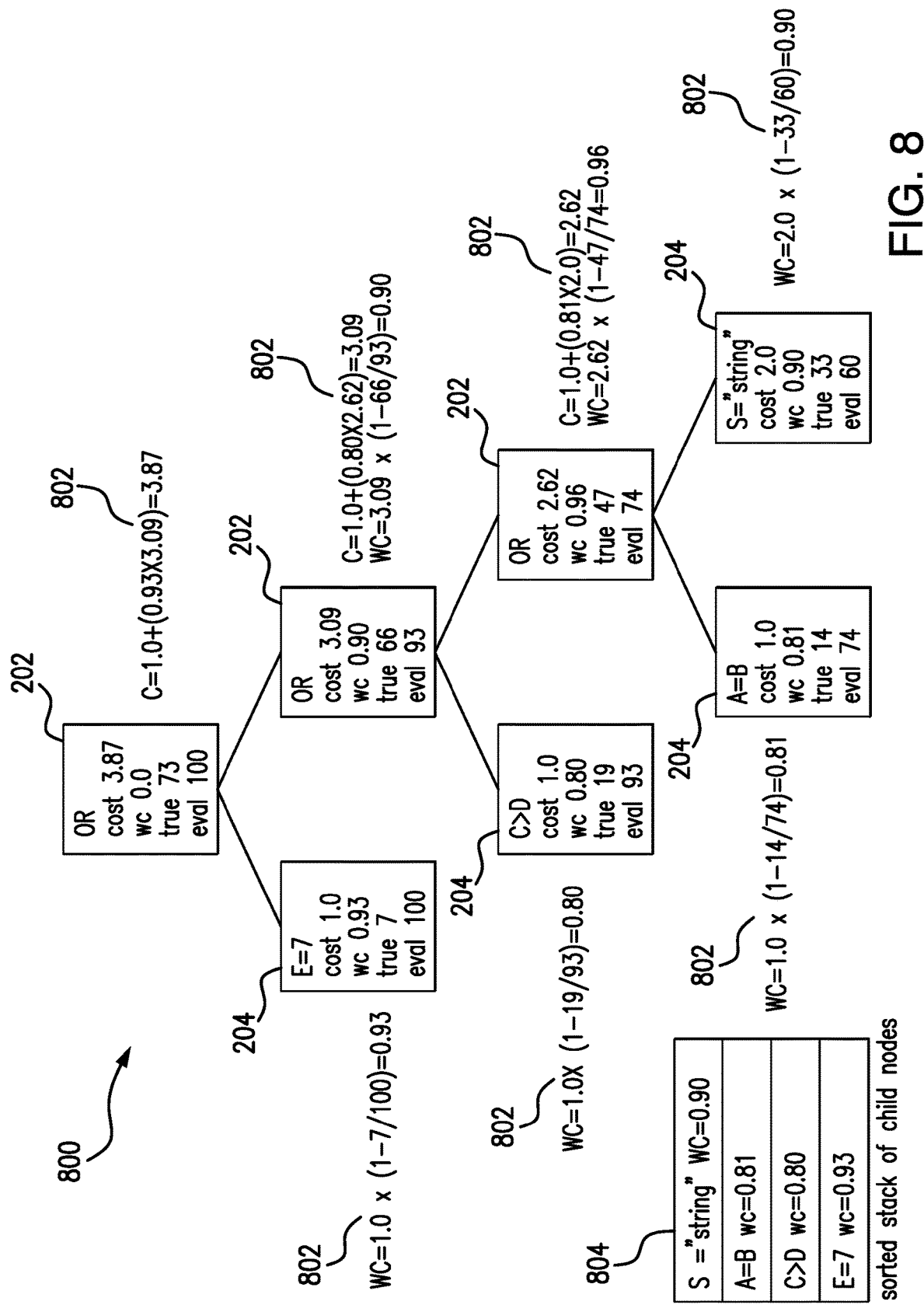
FIG. 8 illustrates a representation of an example homogeneous tree that shows computed costs and weighted costs of usage by the logical expression engine to process still another example logical expression.

A tree (or subtree) where all logical nodes are of the same type is a homogeneous tree. For such a tree, first all the comparison nodes are resorted and then the tree is rewritten with the nodes in their new sorted order. An example homogeneous tree 800 is shown in FIG. 8 that shows computed costs and weighted costs. Each logical node 202 and comparison node 204 in tree 800 indicates:

The node type (in this example there are only OR types for logical nodes 202 and comparison nodes 204 can include (=, <, >).

The calculated cost of evaluating the expression the node represents.

The weighted cost (wc).

The number of times the node evaluated to true.

The number of times the node was evaluated.

At the side of each box, there is an equation 802 showing how that node's cost C and weighted cost WC were calculated. Only the cost of logical nodes 202 is calculated: the cost of the comparison nodes 204 is static and does not change.

Tree 800 is traversed, pushing each comparison node 204 onto a stack. When the traversal is complete, the stack elements are sorted by their weighted cost (wc) values. FIG. 8 also depicts the sorted stack 804 that would result from sorting child nodes of AST 800.

Figure 9:
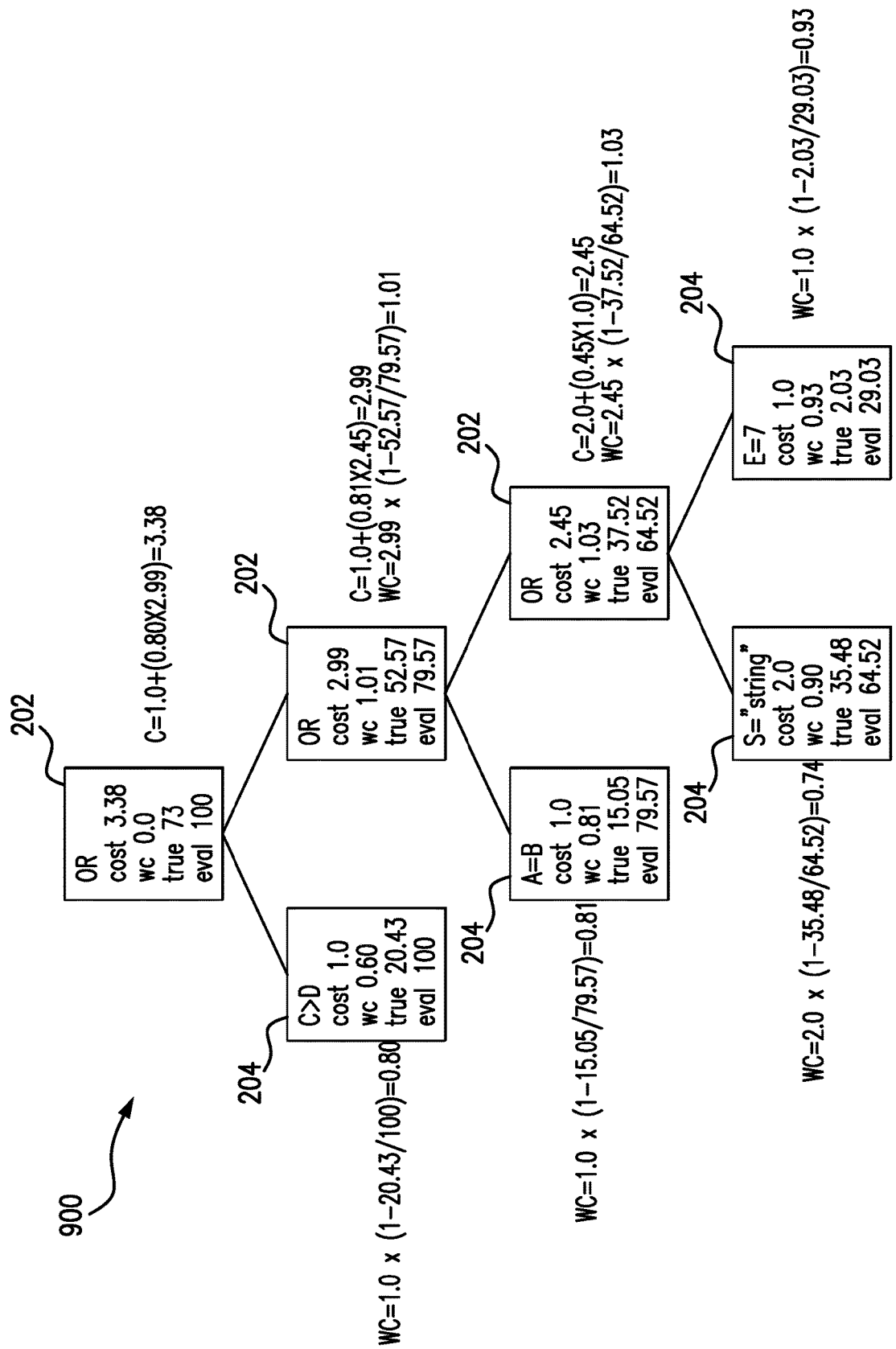
FIG. 9 illustrates a representation of a reordering of the homogeneous tree shown in FIG. 8.

FIG. 9 shows an example tree 900 which is a rewritten version of tree 800 with its child nodes rearranged so that they are configured to be evaluated in order of increasing weighted cost. To do this, tree 800 is traversed again by a left in-order traversal, and upon encountering a comparison node 204, the next element on the sorted stack 804 is popped off of the sorted stack 804 and the popped element is used to replace the element being traversed. Tree 900 shows the results after all replacements are performed.

For comparison nodes 204, the probability of an evaluation yielding true does not change when the evaluation order is changed. This is based on an assumption that individual comparisons in an expression are independent of each other. This assumption, although possibly not always true, can be practical to apply for purposes of simplicity. If there are dependencies that are exposed in a reordering that result in suboptimal performance of a tree configuration, the next periodic reordering may correct this. However, this raises the possibility that the system could cycle between multiple suboptimal states without settling into an equilibrium state. For this reason, the ability to visualize the results, e.g., via by displaying an optimized logical expression that correlates to optimized tree 900, and manually freeze on a particular tree optimization can be desirable. Manual freeze of optimization includes disabling the optimizer. This can be achieved, for example, by user input via a user interface. Once the freeze is applied, the optimizer will no longer be invoked until the freeze option is deselected.

While it can be assumed that $P_t(C)$ does not change for any comparison node C 204 across a reordering, $P_t(L)$ for logical nodes L 202 will change because comparison nodes' parent nodes change. Therefore, when reordering a tree, the counts for 'true' and 'evals' are recomputed for comparison nodes 204 based on their new position in tree 900 and the assumed constant value of $P_t$. This allows recomputation of the 'true' and 'evals' counts for the logical nodes 202, and an update of their costs and weighted costs according to the new tree ordering. Once this is done, a logical node N's left and right child can be swapped when it is determined that for logical node N, WC(N.right)<WC(N.left). N's cost and weighted cost are then recomputed after its child nodes are swapped.

After reordering of tree 900 is completed, the 'true' and 'evals' counts for all nodes are zeroed. This allows total values determined for tree 900 to reflect performance of the AST in its current configuration, which can be used the next time tree 900 is reordered.

Reordering Heterogeneous Trees

Figure 10:
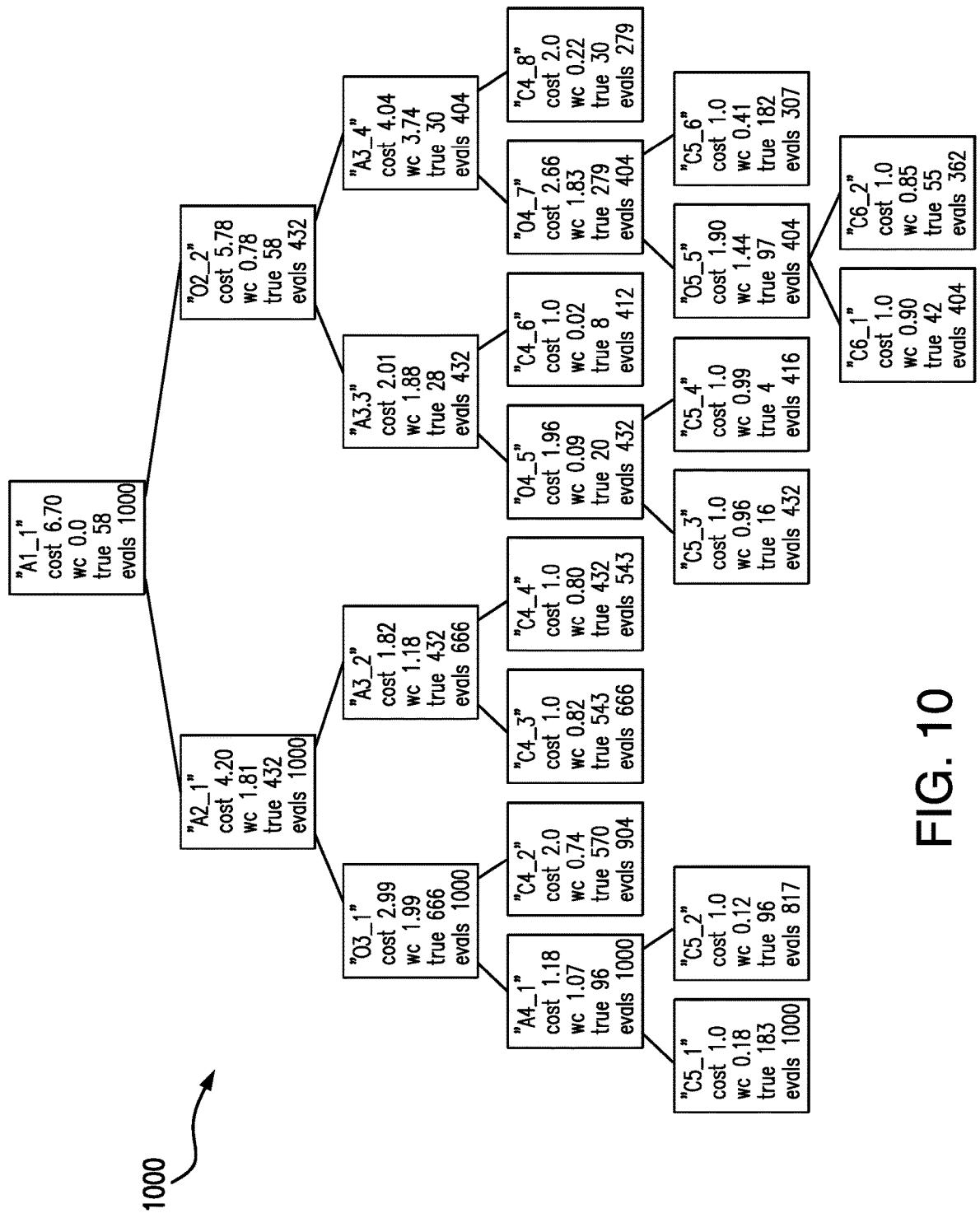
FIG. 10 illustrates a representation of an example heterogeneous tree that shows computed costs and weighted costs of usage by the logical expression engine to process still another example logical expression.

A tree where all of the logical operators are not of the same type is a heterogeneous tree. While heterogeneous child nodes can be swapped, rearrangement of comparison nodes across logical operators of different types would alter semantics of the logical expression. For example, in the expression (A OR B OR C OR D) AND (X OR Y OR Z), the order in which evaluation of the conditions A, B, C, and D is performed can be changed. The order in which evaluation of X, Y, and Z can also be changed. The child nodes of the AND operator can be swapped and (X OR Y OR Z) can be evaluated before (A OR B OR C OR D). The two different OR phrases are sorted and rewritten as separate subtrees. FIG. 10 illustrates a more complex example of a heterogeneous AST.

With reference to FIG. 10, an example tree diagram is provided that shows logical nodes 202 of a tree 1000 that corresponds to a heterogeneous AST.

FIG. 10 uses the following node naming conventions for logical nodes 202:
 The first character of the node name indicates its type: 'A' for AND nodes, 'C' for comparison nodes, and 'O' for OR nodes.
 The number following the first character indicates the node's level in the tree, starting with 1 for the root node and increasing down from there.
 The number following the underscore is the index of the node in that level of the tree, starting at 1 for the leftmost node and increasing to the right.

Figure 11:
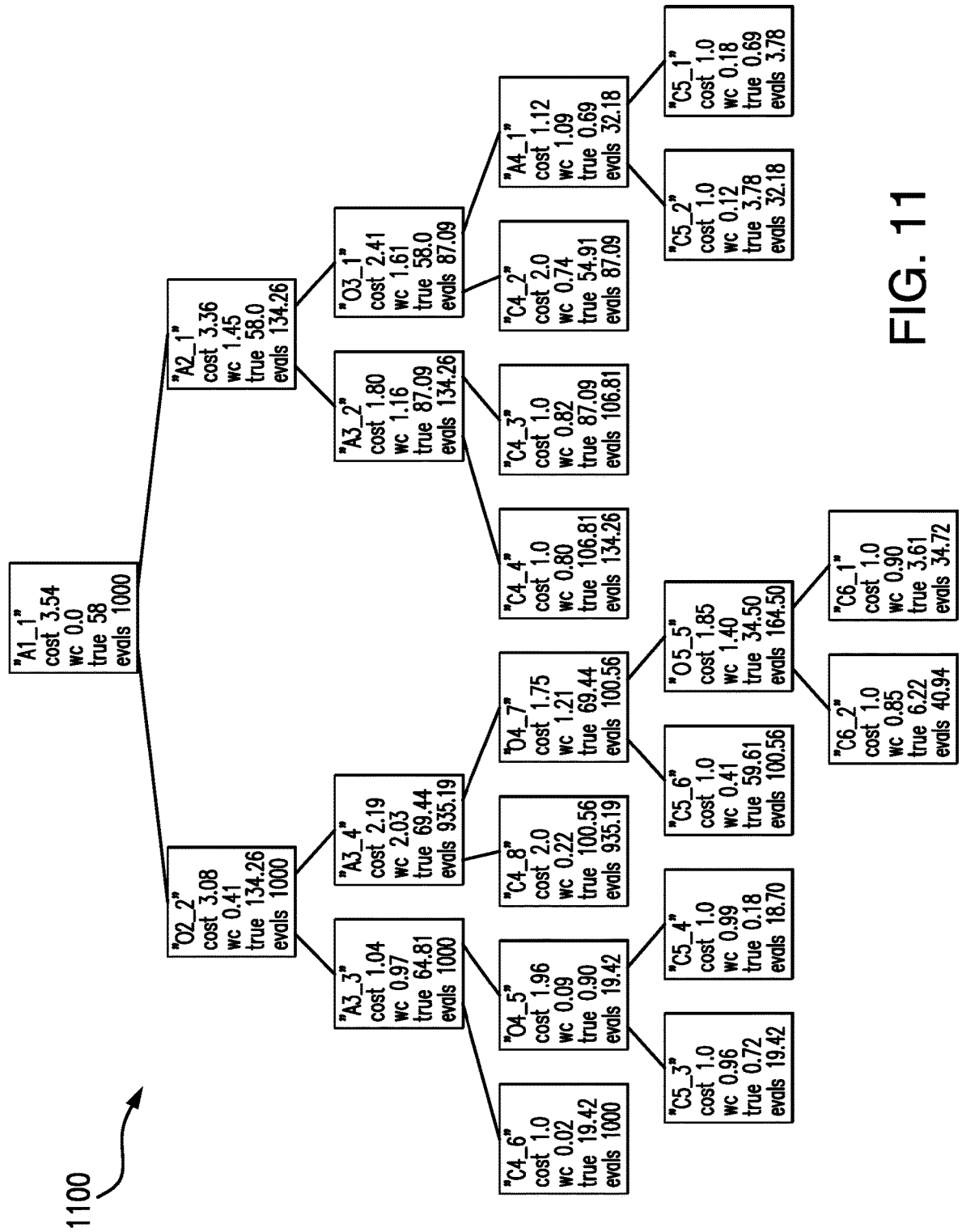
FIG. 11 illustrates a representation of a reordering of the heterogeneous tree shown in FIG. 10.

With reference to FIG. 11, an example tree diagram is shown of an example AST 1100 which is the result of reordering logical nodes 202 of tree 1000 of FIG. 10. AST 1100 includes recomputed values for counters and costs associated with each logical node 202. The reordering results in a substantial reduction in overall cost, namely the calculated cost for a root logical node 202 labeled A1_1 is reduced from 6.70 (in FIG. 10 before the reordering) to 3.54 (in FIG. 11 after the reordering).

The Reordering Algorithm

With reference now to FIGS. 12-18, shown are flowcharts demonstrating implementation of the various exemplary embodiments for reordering a tree associated with an AST. It is noted that the order of operations shown in FIGS. 12-18 is not required, so in principle, certain of the various operations may be performed out of the illustrated order or in parallel. Also, certain operations may be skipped, different operations may be added or substituted, or selected operations or groups of operations may be performed in a separate application following the embodiments described herein.

Example trees referred to in FIGS. 12-18 have the following node types:
 COMPARISON_OP
 LOGICAL_AND
 LOGICAL_OR Each node of the tree has the following properties:
 Type
 True (count of the number of times the expression this node represents evaluated to true)
 Evals (count of the number of times the expression this node represents was evaluated)
 Cost (the cost of evaluating the node's expression: this is static for COMPARISON_OP nodes, and is calculated for LOGICAL_AND and LOGICAL_OR nodes)
 Weighted cost (wc)
 Left (the left child node, if any)
 Right (the right child node, if any)
 Recomputed (this is a flag that is true if the node's 'true' and 'evals' counts, and its cost, have been recomputed during reordering of the tree, and false if the counts and cost need to be recomputed)

Figure 12:
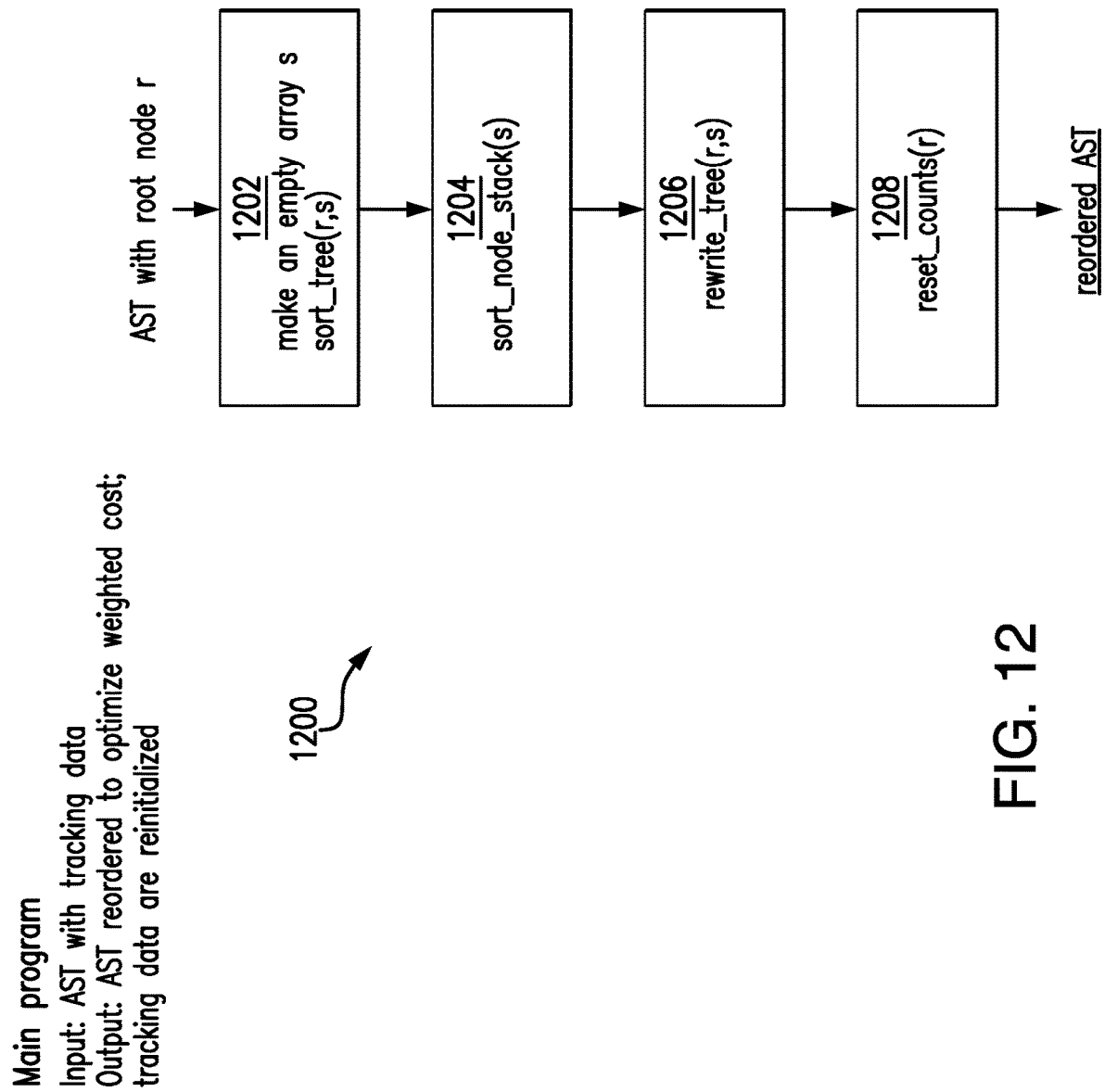
FIGS. 12-17F illustrate flowcharts of an example method performed by an optimizer of the logical expression engine of the information processing system shown in FIG. 1 in accordance with an illustrative embodiment of the present disclosure.

FIGS. 12-18 illustrate operations of an example method performed by an optimizer, such as optimizer 102 shown in FIG. 1. With reference to FIG. 12, it represents an overall method that receives as input an AST represented as a tree rooted in node r. The overall method uses tracking data stored in each node of the tree to calculate an optimal reordering of the tree. When the method completes, the tree has been reordered and all internal counters associated with the nodes are reset to 0. At operation 1202, the root AST node r is received, and an empty array s is configured. s is used to accumulate comparator nodes for sorting as outlined in the section "Reordering an AST" above. When the tree is traversed, all comparator nodes in s are accumulated as long as their respective parent node is of the same type as r. Operation 1202 is described in greater detail with respect to FIGS. 13A-13B.

At operation 1204, the nodes are sorted in s by weighted cost. s is treated as a stack when rewriting the AST, wherein nodes are popped off of s in ascending order of weighted cost (cheapest nodes first). Operation 1204 is described in greater detail with respect to FIG. 14.

Figure 15A:
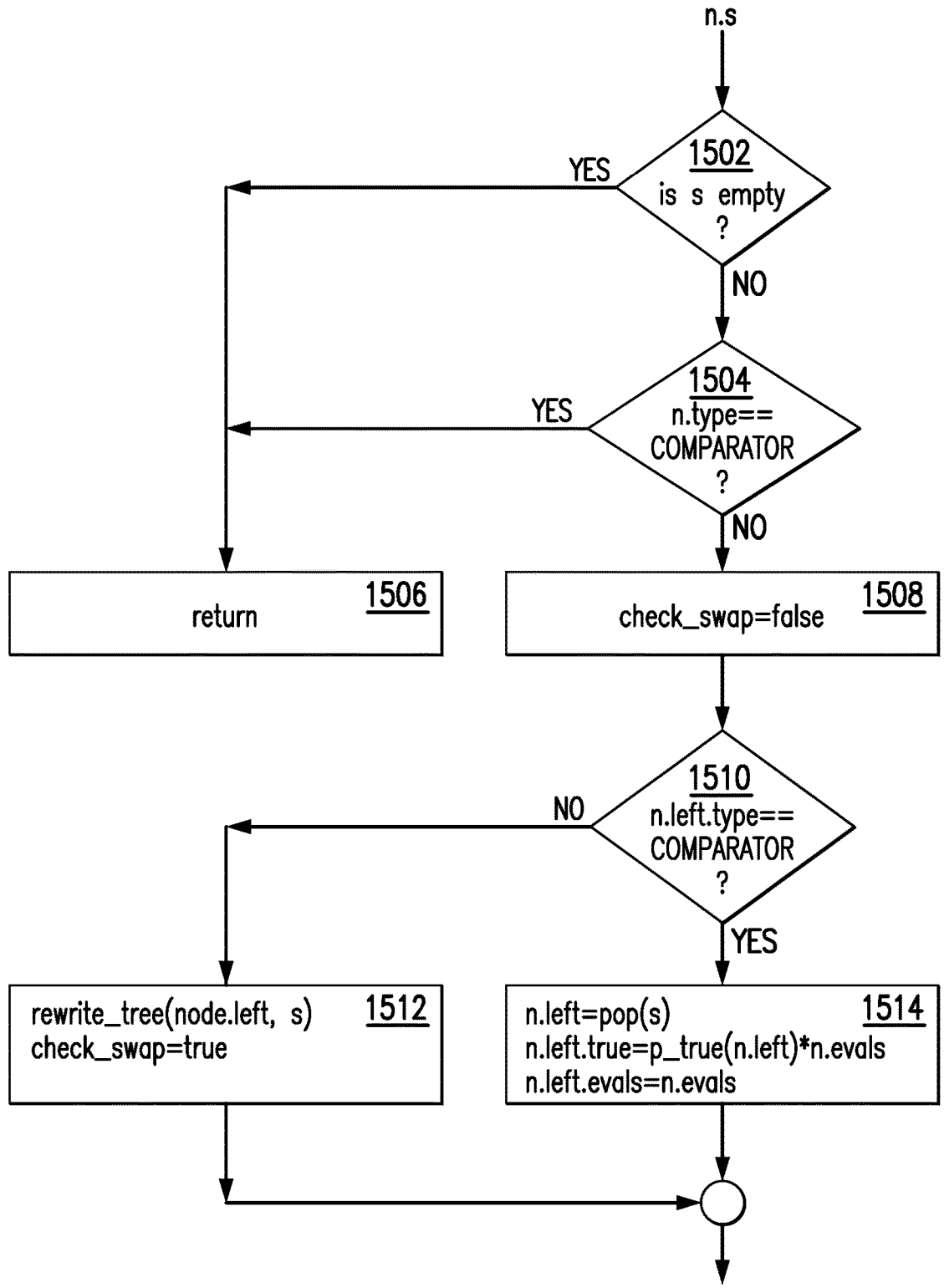
Figure 15B:
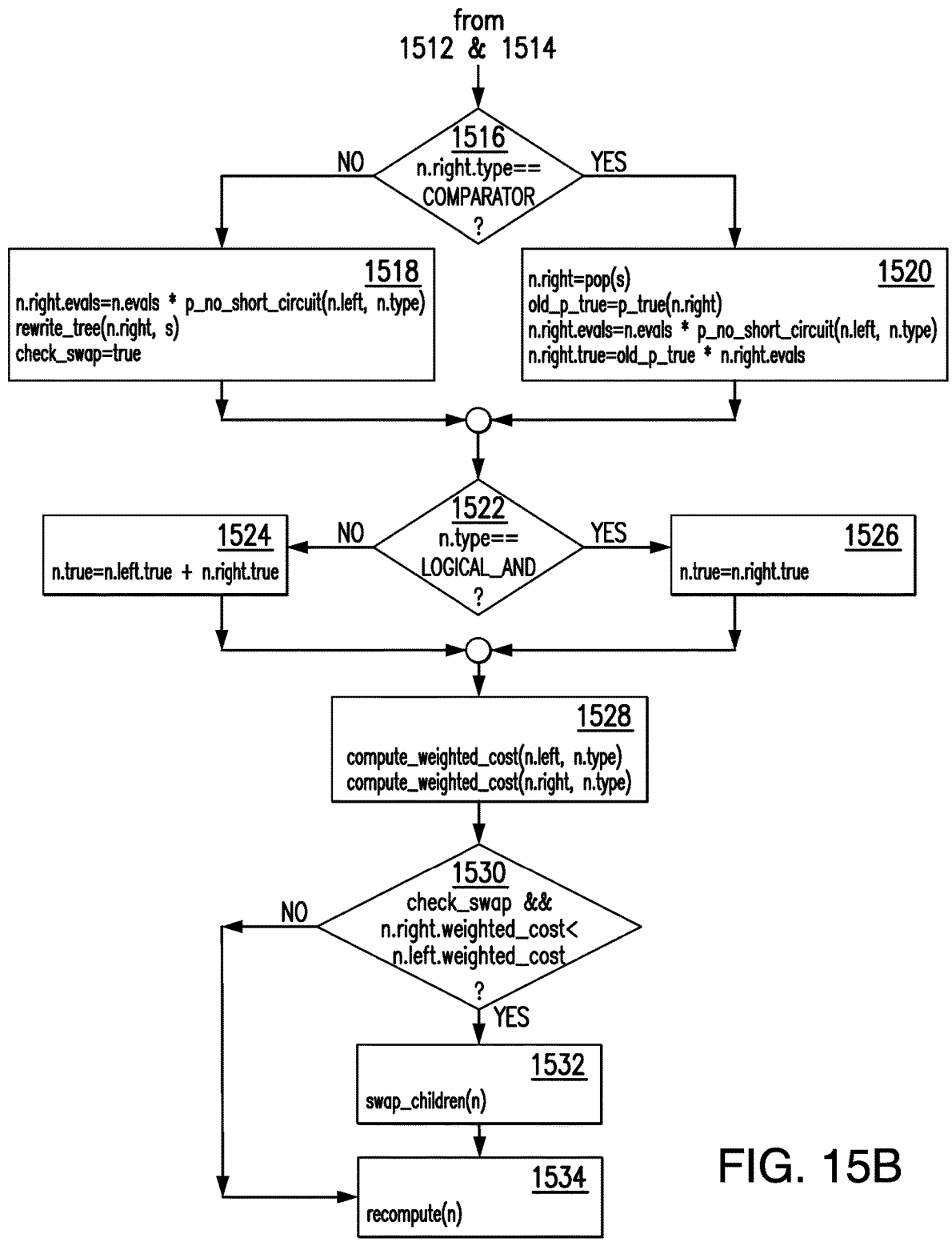

At operation 1206, the AST is rewritten using the sorted node stack from operation 1204. FIGS. 15A-15B describe and show operation 1206 in greater detail. At operation 1208, the evals and true counters are reset for every node in the AST in preparation for the accumulation of tracking data for the reordered tree.

Figure 13A:
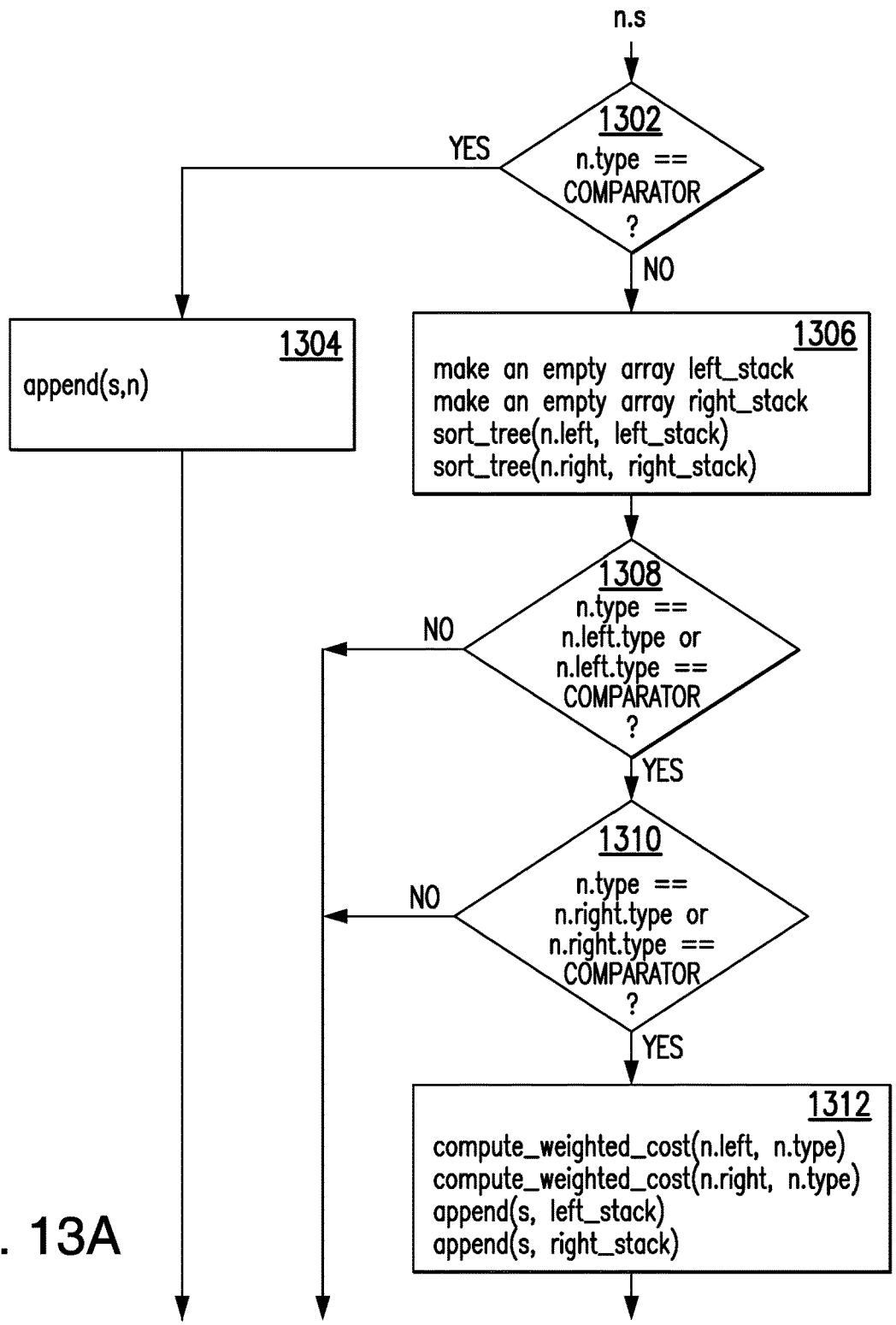
Figure 13B:
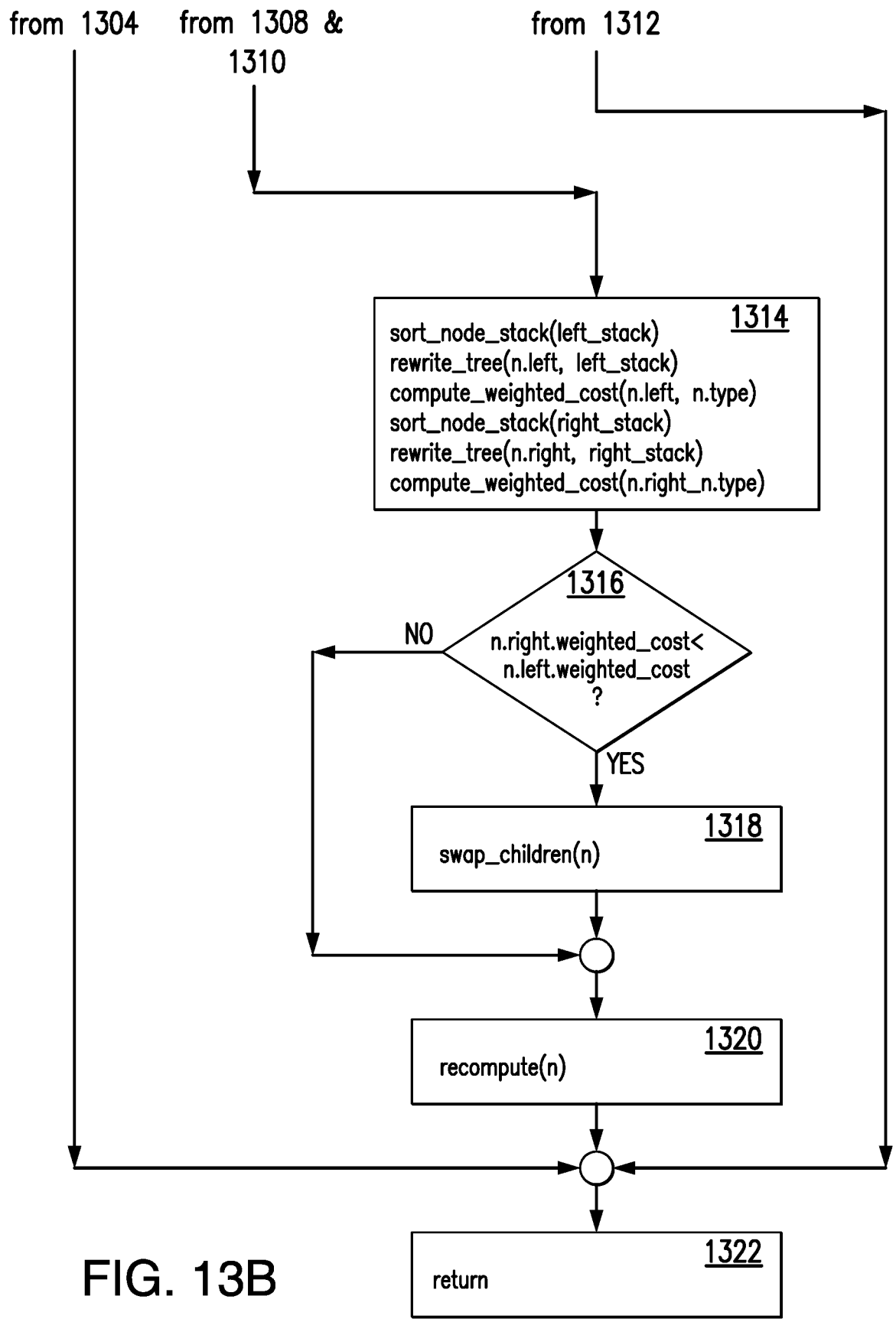

With reference to FIGS. 13A-13B, example details of operation 1202, the sort_tree operation, are described. The sort_tree operation receives an AST node n and a node stack s. The basic idea of this stage of the algorithm is to traverse the tree rooted in n and accumulate in s those comparator nodes that could be rearranged under n. This rearrangement can be done as long as the child nodes are of the same type as n or are comparator nodes (as described in greater detail in the section above entitled "Reordering Heterogeneous Trees."

At operation 1302, it is determined whether n is a comparator node. If so, meaning n is determined to be a comparator node, n is appended to s (at operation 1304) and the method continues at operation 1322. Otherwise, the method continues at operation 1306.

At operation 1306, two new empty node stacks are created: one for the left subtree and one for the right. Then sort_tree is invoked recursively for the left and right child nodes, passing in the new node stacks.

At operations 1308 and 1310, it is determined whether both of n's left and right child nodes are either comparator nodes or of the same type as n. If so, meaning the condition in operations 1308 and 1310 are determined to be true, the method continues at operation 1312. Otherwise, the method continues at operation 1314.

At operation 1312, the weighted cost of each of n's children is recomputed and appended to the contents of the two new node stacks (created in operation 1306) to s. The method continues at operation 1322.

At operation 1314, the node stack applied to n's left child in operation 1306 is sorted, then rewrite_tree is invoked on the left child, using its sorted node stack. The function rewrite_tree is shown and described in greater detail with respect to FIGS. 15A-15B. After the tree rooted in n's left child has been rewritten, its weighted cost is recomputed. Operation 1314 is repeated for n's right child, using the node stack from operation 1306 that was used to accumulate its child nodes.

At operation 1316, it is determined whether the weighted cost of n's right child is less than the weighted cost of the left child. If the condition determined at operation 1316 is true, the method continues at operation 1318. Otherwise, the method continues at operation 1320.

At operation 1318, the left and right child nodes are swapped and the method continues at operation 1320. The function swap_children is shown and described in greater detail with respect to FIG. 17E.

Figure 16:
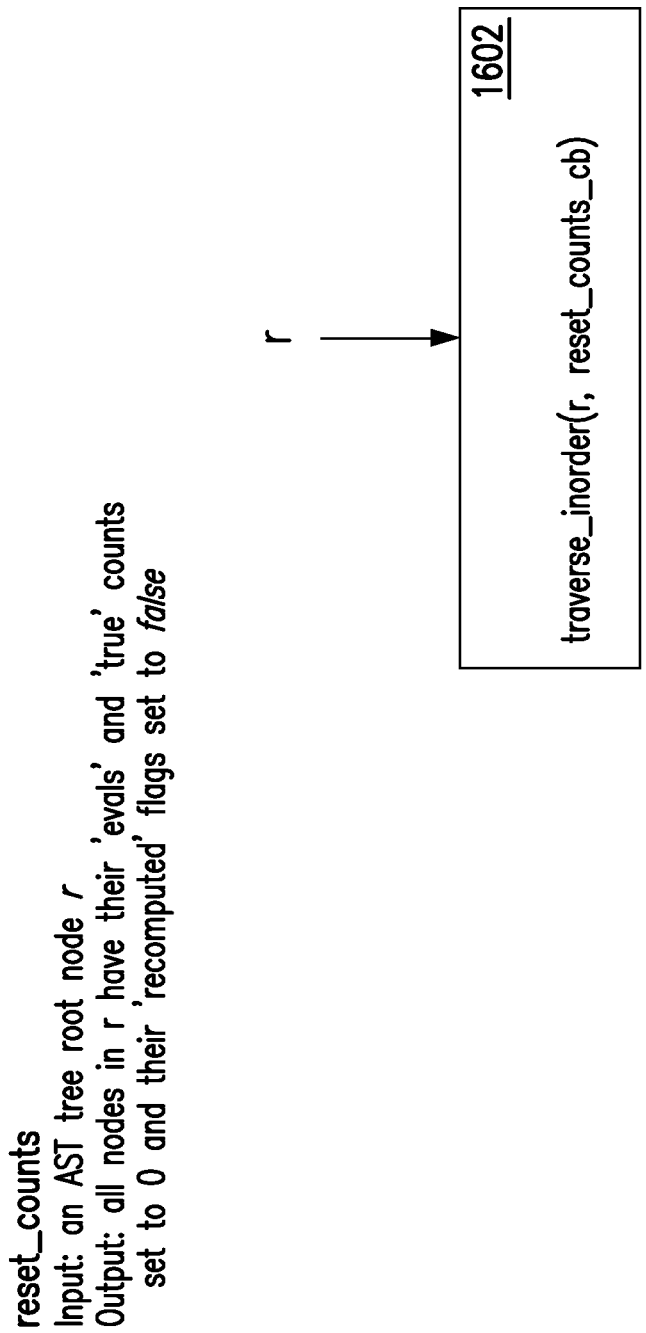

At operation 1320, n's evals and true counters and cost are recomputed, which is shown and described in greater detail with respect to FIG. 16.

At operation 1322, return operation is performed. At this stage, if n is a homogeneous tree, s will contain all of n's child comparator nodes. If n is a heterogeneous tree, n has already been rearranged and rewritten.

Figure 14:
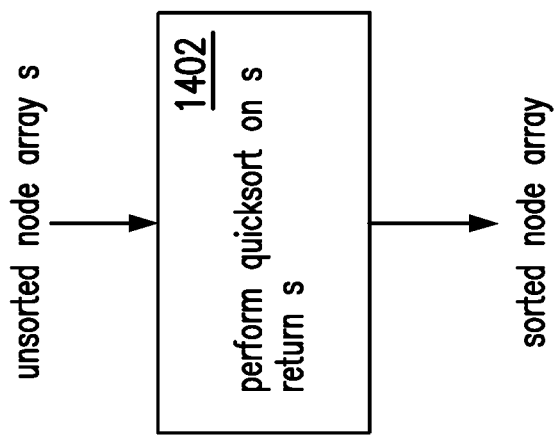

With reference to FIG. 14, operation 1204 is shown and described in greater detail. At operation 1402, a standard quicksort is performed on an array of nodes. After the sort is completed, the array will hold the nodes sorted in descending order of weighted cost, so that when elements are popped off the array, the elements will be popped in ascending order of weighted cost.

FIGS. 15A and 15B describe operation 1206 in greater detail. At operation 1502, it is determined whether the received node stack is empty. If it is determined to not be empty, the method continues at operation 1504. Otherwise, meaning the received node stack is determined to be empty, the method continues at operation 1506.

At operation 1504, it is determined whether the current node is a comparator node. If it is determined at operation 1504 that the current node is a comparator node, to the method continues at operation 1506. Otherwise, meaning it was determined that the current node is not a comparator node, the method continues at operation 1508. At operation 1506, a return operation is performed. At operation 1508, a check_swap flag is set to false and the method continues at operation 1510. At operation 1510, it is determined whether the current node's left child is a comparator node. If it is determined at operation 1510 that the current node's left child is not a comparator node, the method continues at operation 1512. Otherwise, meaning it is determined at operation 1510 that the current node's left child is a comparator node, the method continues at operation 1514.

Figure 17A:
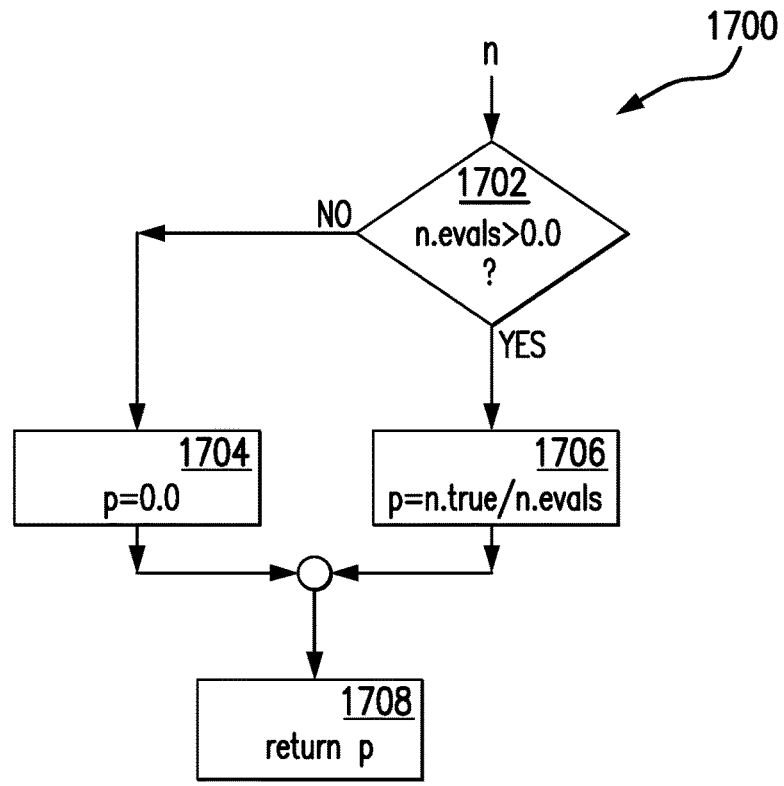
Figure 17A:
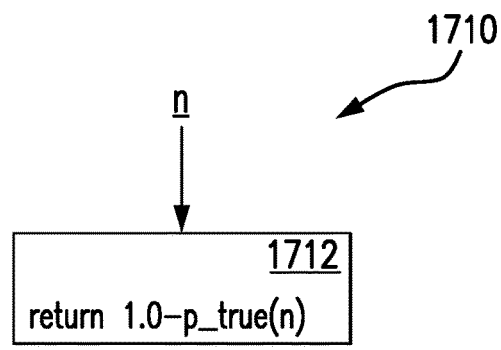

At operation 1512, the tree rooted in the left child node is recursively rewritten using s and check_swap is set to true. The method continues at operation 1516. At operation 1514, the current node's left child is replaced with the next comparator node popped from s. Then recompute the current node's true count and update the current node's eval count, assuming that a probability of evaluating to true is unaltered for the current node in its new position in the tree. Because the left child of a node is always evaluated, the left child's eval count is the same as that of its parent node. FIG. 17A shows and describes function p_true in greater detail. At operation 1516, it is determined whether the current node's right child is a comparator node. If it is not, the method continues at operation 1518. Otherwise, we go to operation 1520.

Figure 17B:
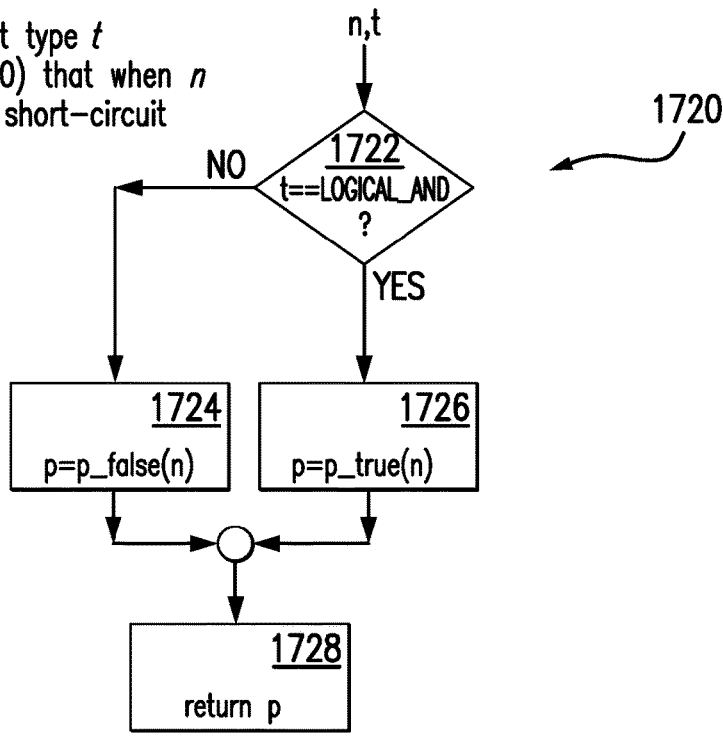
Figure 17B:
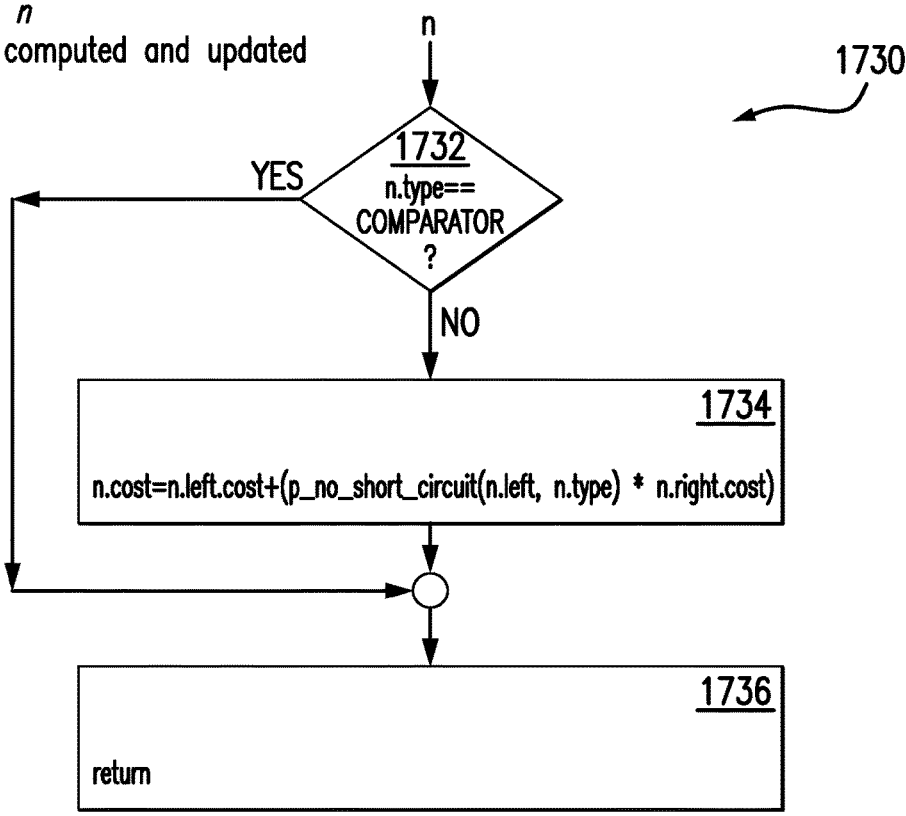

At operation 1518, the right child's evals count is recomputed, which is the current (parent) node's evals count multiplied by the probability that evaluating the left child node will not allow evaluation of the right child to be skipped. Next, recursively rewrite the tree rooted in the right child node is rewritten using s. Then check_swap is set to true and the method continues at operation 1522. FIG. 17B shows operation p_no_short_circuit in greater detail. At operation 1520, the current node's right child is replaced with the next comparator node popped from s. The right child's probability of evaluation as true is saved in old_p_true. The right child's evals count is recomputed using the same method as described with respect to operation 1518. The right child's true count is recomputed by multiplying the recomputed evals count by old_p_true. The method continues at operation 1522.

At operation 1522, the current node's type is tested. If the current node's type is a LOGICAL_AND, the method continues at operation 1526. If the current node's type is a LOGICAL_OR, the method continues at operation 1524. At operation 1524, the true count of a LOGICAL_OR node is recomputed. The recomputed count is equivalent to the sum of both child nodes' true counts. The method continues at operation 1528.

Figure 17C:
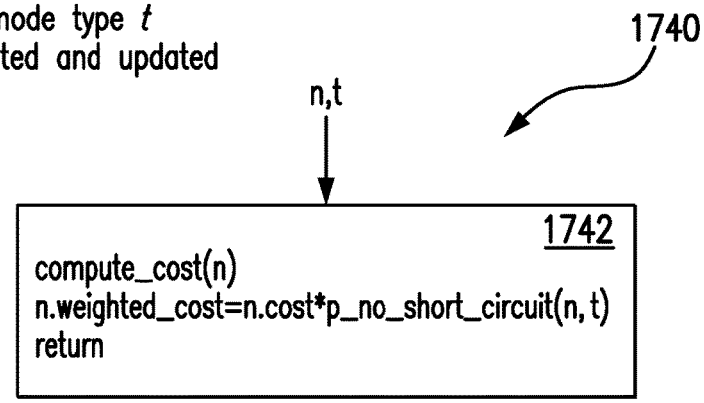
Figure 17C:
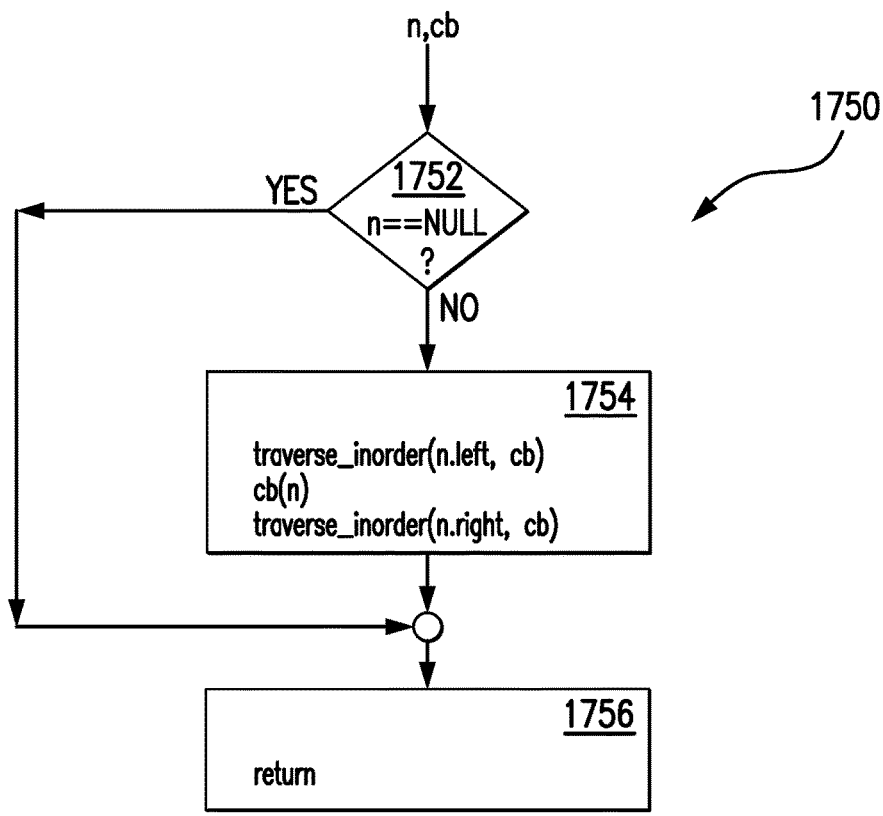

At operation 1526, the true count of a LOGICAL_AND node is recomputed. The recomputed count is equal to the number of times its right child evaluates to true. The method continues at operation 1528. At operation 1528, the weighted cost of the current node's left and right child nodes is recomputed. FIG. 17C shows and describes operation compute_weighted_cost in greater detail.

At operation 1530, if check_swap is true, it is determined whether the weighted cost of the current node's right child is less than that of the left child. If so, meaning it is determined that the weighted cost of the current node's right child is less than that of the left child, the method continues at operation 1532. If check_swap is false or the left child is less costly than (or equal in cost to) the right child, the method continues at operation 1534. At operation 1532, the left and right child nodes are swapped so that the less expensive child is evaluated first. FIG. 17E shows and describes operation swap_children in greater detail. At operation 1534, the true and evals counts is recomputed for all the nodes in the tree rooted in the current node. FIG. 17F shows and describes operation recompute in greater detail.

With reference to FIG. 16, operation 1208 is shown in greater detail. In operation 1602, an in-order traversal of the AST rooted in r is performed, invoking reset_counts_cb for each node. FIG. 17E shows and describes operation reset_counts_cb in greater detail and FIG. 17C shows operation traverse_inorder in greater detail.

With respect to FIGS. 17A-F, utility functions referenced above are now described in greater detail. With reference to FIG. 17A, the function p_true is shown and described in greater detail with respect to flowchart 1700, in which an AST node is received with tracking data. Using the node's counts of the number of times it was evaluated and the number of times the node evaluated to true, the p_true function computes the probability of a true evaluation. At operation 1702, it is determined whether the evals count is greater than 0. If not, meaning the evals count is not greater than 0, the method advances to operation 1704. Otherwise, meaning the evals count is greater than 0, the method continues at operation 1706. At operation 1704, the computed probability is set to 0 and the method continues at operation 1708.

At operation 1706, the probability of a true evaluation is computed by dividing the true count by the evals count, and then the method continues at operation 1708.

At operation 1708, the computed probability is returned. The function p_false, shown at example flowchart 1710, is the inverse of p_true: wherein the probability of an evaluation yielding a value of false is computed. At operation 1712, the probability that evaluating the input node will result in a value of false is computed. This computation can be 1.0 minus the probability of a true evaluation computed at operation 1706. Operation 1712 includes returning the computed probability.

With reference to FIG. 17B, the function p_no_short_circuit is shown and described in greater detail with respect to flowchart 1720, in which an AST input node n is received as well as a type of a parent of the input node. The probability is computed that evaluating an input node will not allow evaluation of the input node's right sibling to be skipped. This computation is dependent upon the type of the input node's parent: if the parent node's type is LOGICAL_AND, a value of false allows for short-circuit evaluation. If the parent node's type is LOGICAL_OR, a value of true enables short-circuit evaluation. The probability of not enabling short-circuit evaluation is the inverse of these.

With reference to flowchart 1720, at operation 1722, it is determined whether the parent node's type is LOGICAL_AND. If it is not, meaning the parent node's type is not LOGICAL AND, the method continues at operation 1724. Otherwise, meaning the parent node's type is LOGICAL AND, the method continues at operation 1726.

At operation 1724, the probability is computed by passing the input node to the function p_false (which is shown and described with respect to flowchart 1710 of FIG. 17A). The method continues at operation 1728.

At operation 1726, the probability is computed by passing the input node to the function p_true (which is shown and described with respect to flowchart 1700 of FIG. 17A). The method continues at operation 1728. At operation 1728, the computed probability, having a value between 0.0 and 1.0, is returned.

With reference to flowchart 1730, the function compute_cost computes the cost of non-comparator nodes, in which an AST input node n is received. It is noted that the cost of comparator nodes never changes. The cost of evaluating the input node is calculated as the cost of evaluating the input node's left child (the left child is always evaluated) plus the cost of evaluating the right child multiplied by the probability of a need to evaluate it.

At operation 1732, the input node's type is determined. If the input node is a comparator node (meaning type=comparator), the method continues at operation 1736. Otherwise, meaning the input node's type is not comparator, the method continues at operation 1734.

At operation 1734, the cost of evaluating the input node is calculated as to be the cost of evaluating the input node's left child plus the cost of evaluating the right child multiplied by the probability of a need to evaluate it. The method continues at operation 1736. At operation 1736, the method returns.

With reference to FIG. 17C, the function compute_weighted_cost is shown and described in greater detail with respect to flowchart 1740 in which an AST input node n and the input node's parent node's type is received. The input node's weighted cost is computed as a function of the cost of evaluating the node and the probability that doing so will not allow evaluation of its sibling node to be skipped. Thus, the weighted cost of a node increases with the likelihood of needing to evaluate its sibling in addition to itself. At operation 1742, the raw cost of the input node is first computed by applying the compute_cost function to the input node (which is shown and described with respect to FIG. 17B). The weighted cost is computed as a function of the cost of evaluating the node and the probability that doing so will not allow evaluation of its sibling node to be skipped, and the input node's weighted cost is then updated in the node's properties.

With reference to flowchart 1750, the function traverse_inorder performs is shown and described in greater detail in which an AST input node n and an input callback function cb are received, and an in-order traversal of the tree rooted in n is performed and the callback function is applied to each node. At operation 1752, it is determined whether the received node input node is NULL. If so, meaning the input node is NULL, the method skips to operation 1756. Otherwise, the method continues at operation 1754. At operation 1754, the left child node is recursively traversed, the callback function is invoked for application to the input node, and the right child node is recursively traversed. The method continues at operation 1756. At operation 1756, the method returns.

Figure 17D:
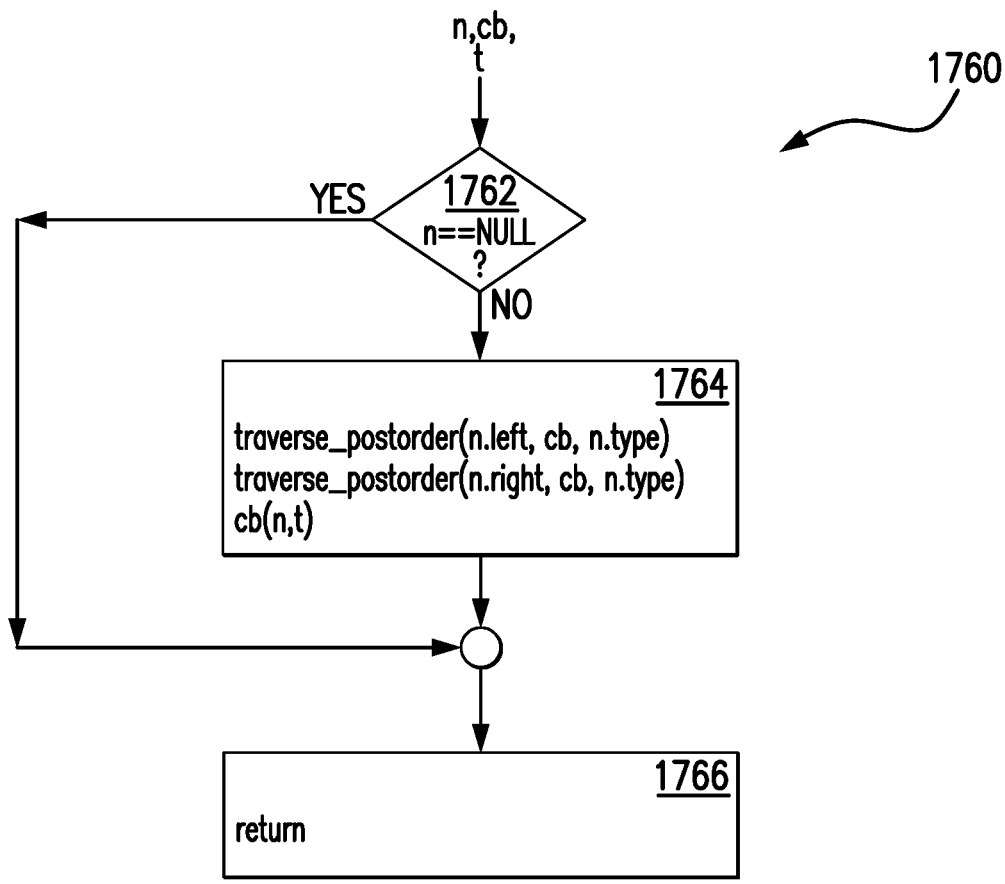
Figure 17D:
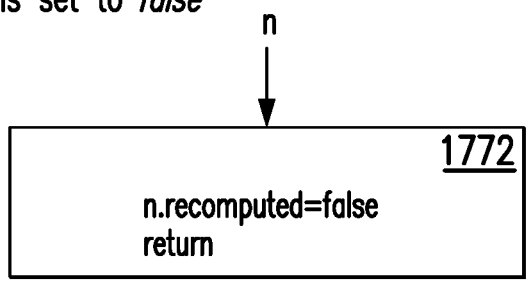
Figure 17F:
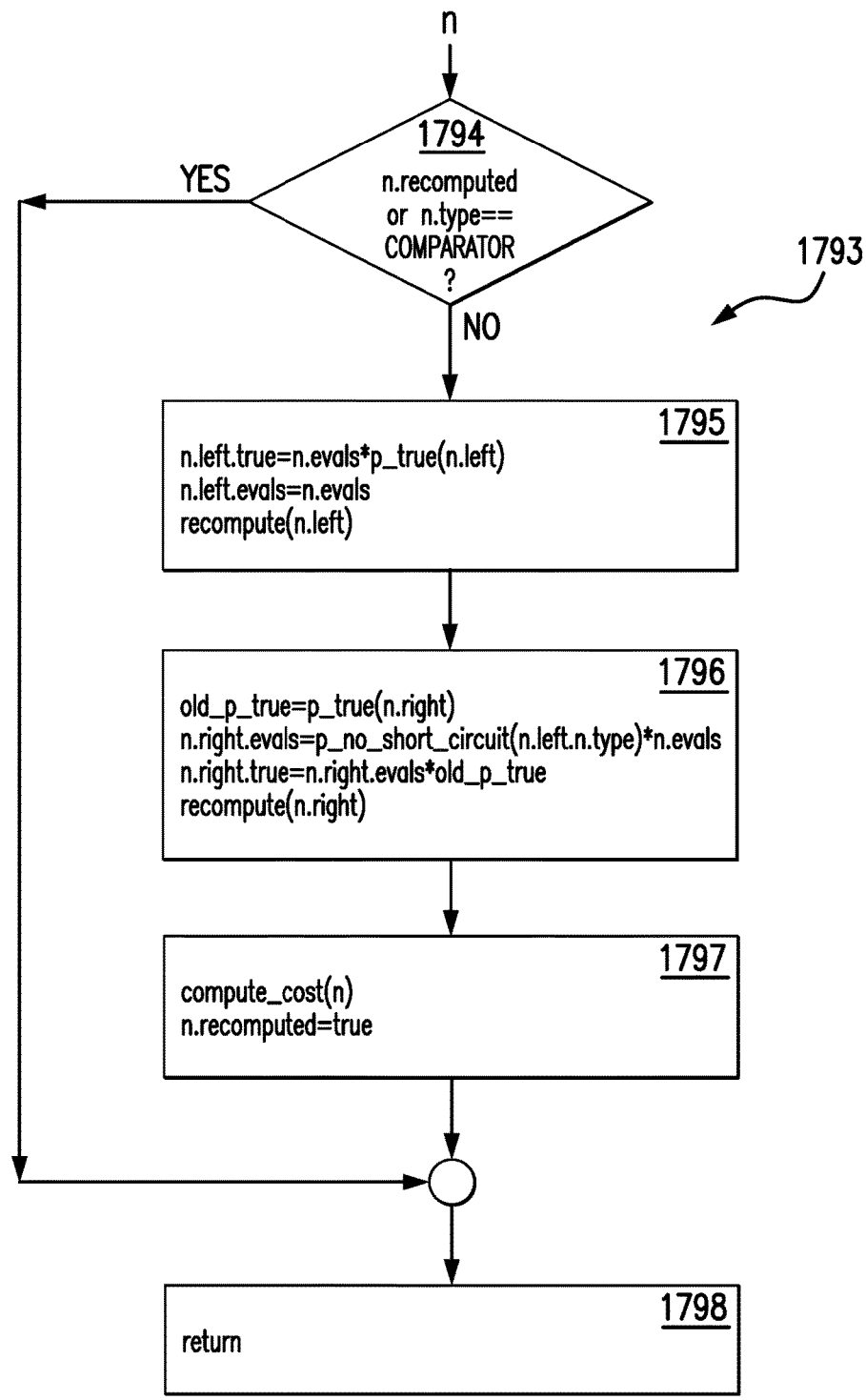

With reference to FIG. 17D, the function traverse_postorder is shown and described with respect to flowchart 1760, which receives an input AST node n, a callback function cb, and the input node's parent's type t. A postorder traversal of the tree rooted in n is performed and a callback function is applied to each node. At operation 1762, it is determined whether the input node is NULL. If so, meaning the input node is NULL, the method skips to operation 1766. Otherwise, meaning the input node is not NULL, the method continues at operation 1764. At operation 1764, the left child node is recursively traversed, then the right child node is recursively traversed, the callback function is invoked and applied to the input node. The method continues at operation 1766. At operation 1766, the method returns, with its output depending on the callback function's actions.

The function reset_recomputed_cb is shown and described with respect to flowchart 1770, which is used as a callback function. This callback function receives an input node n and sets input node n's recomputed flag to false. At operation 1772, the input node's flag is reset to false and the method returns.

With reference to FIG. 17E, the function swap_children is shown and described with respect to flowchart 1780, which receives an input AST node n. The left and right child nodes of the input node are swapped. Because the child nodes have now changed position in the tree, the recomputed flags of all the nodes rooted in the input node are reset to false. This enables recomputation of evals and true counts for these nodes.

At operation 1782, the left child is stored in a temporary variable. The left child node is set to the right child node. Then the right child node is set to the original left child node. Then an in-order traversal of the tree rooted in the input node is performed, applying the reset_recomputed_cb function to each node traversed (reset_recomputed_cb is shown and described with respect to FIG. 17D).

The function reset_counts_cb is shown and described with respect to flowchart 1790, which receives an input AST node n and is used as a callback function that resets the input node's evals and true counts and its recomputed flag. At step 1792, the input node's evals and true counts are reset to 0 and the recomputed flag is set to false.

With reference to FIG. 17F, the recompute function for recomputing a node's cost is shown and described with respect to flowchart 1793. This function includes first recomputing costs of the input node's children. If recompute is applied to a comparator node, there is no need to perform any computation because the node would already have been recomputed when its parent node was visited. A node's recomputed flag allows for skipping multiple recomputations of a node due to the recursive nature of the algorithm used.

At operation 1794, the input node's recomputed flag and type are determined. If the recomputed flag is true or if the node is a comparator node, the method skips to operation 1798. Otherwise, meaning the recomputed flag is false and the node is not a comparator node, the method continues at operation 1795. At operation 1795, the left child node is recomputed. The node's true count is recalculated. Due to a left child node being evaluated for each evaluation of its parent node, its evals count is the same as its parent's. Therefore, the updated true count is simply the left child node's probability of yielding true (which is shown and described with respect to flowchart 1700 of FIG. 17A) when evaluated multiplied by its parent node's evals count. The evals count is set to that of the left child node's parent. Then the left child is recursively recomputed and the method continues at operation 1796.

At operation 1796, the right child node is recomputed. The probability of the right child node evaluating to true is saved in a temporary variable old_p_true (wherein the function p_true is shown and described with respect to flowchart 1700 of FIG. 17A). The right child node's evals count is recalculated by multiplying the probability of needing to evaluate the right child node by the number of times its parent node is evaluated (wherein function p_no_short_circuit is shown and described with respect to flowchart 1720 of FIG. 17B). The right child node's true count is updated. The updated number of evaluations is calculated as the saved probability of evaluating to true times the updated evals count. The right child is recursively recomputed. The method continues at operation 1797.

At operation 1797, the cost of the recomputed node is calculated using the function compute_cost (which is shown and described with respect to FIG. 17B). The recomputed node's recomputed flag is set to true and the method continues at operation 1798. At operation 1798, the method returns.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments processing performed by the logical expression engine 102 may be implemented or executed by one or more computer systems. For example, processing performed by logical expression engine 102 can be implemented using a computer system such as example computer system 1800 illustrated in FIG. 18. In various embodiments, computer system 1800 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1800 is only one example of a suitable system and is not intended to suggest any limitation as to the scope of use or functionality of embodiments of the disclosure described herein. Regardless, computer system 1800 is capable of being implemented and/or performing any of the functionality set forth hereinabove.

Computer system 1800 may be described in the general context of computer system-executable instructions, such as program modules, being executed by a computer system. Generally, program modules may include routines, programs, objects, components, logic, data structures, and so on that perform particular tasks or implement particular abstract data types. Computer system 1800 may be practiced in distributed data processing environments where tasks are performed by remote processing devices that are linked through a communications network. In a distributed data processing environment, program modules may be located in both local and remote computer system storage media including memory storage devices.

Figure 18:
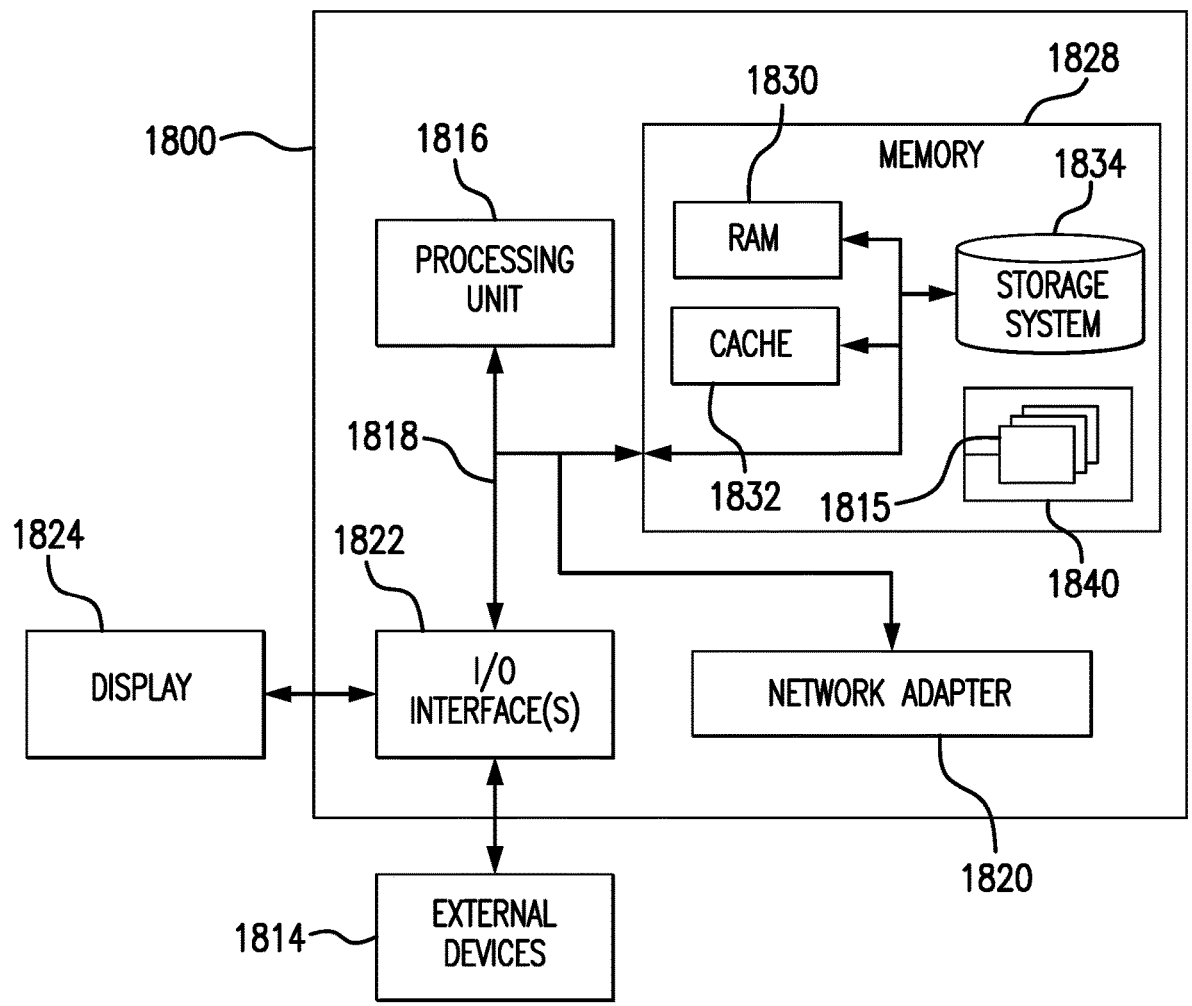
FIG. 18 illustrates an example computer system for implementing a logical expression engine, in accordance with an illustrative embodiment of the present disclosure.

Computer system 1800 is shown in FIG. 18 in the form of a general-purpose computing device. The components of computer system 1800 may include, but are not limited to, one or more processors or processing units 1816, a system memory 1828, and a bus 1818 that couples various system components including system memory 1828 to processor 1816.

Bus 1818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1800 typically includes a variety of computer system readable media. Such media may be any available media that is accessible by the logical expression engine 102, and it includes both volatile and non-volatile media, removable and non-removable media.

System memory 1828 can include computer system readable media in the form of volatile memory, such as random access memory (RAM) 1830 and/or cache memory 1832. Computer system 1800 may further include other removable/non-removable, volatile/non-volatile computer system storage media. By way of example only, storage system 1834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1818 by one or more data media interfaces. As will be further depicted and described below, memory 1828 may include at least one program product having a set (e.g., at least one) of program modules that are configured to carry out the functions of embodiments of the disclosure.

Program/utility 1840, having a set (at least one) of program modules 1815 may be stored in memory 1828 by way of example, and not limitation, as well as an operating system, one or more application programs, other program modules, and program data. Each of the operating system, one or more application programs, other program modules, and program data or some combination thereof, may include an implementation of a networking environment. Program modules 1815 generally carry out the functions and/or methodologies of embodiments of the disclosure as described herein.

Computer system 1800 may also communicate with one or more external devices 1814 such as a keyboard, a pointing device, a display 1824, etc.; one or more devices that enable a user to interact with computer system 1800; and/or any devices (e.g., network card, modem, etc.) that enable the logical expression engine 102 to communicate with one or more other computing devices. Such communication can occur via Input/Output (I/O) interfaces 1822. Still yet, computer system 1800 can communicate with one or more networks such as a local area network (LAN), a general wide area network (WAN), and/or a public network (e.g., the Internet) via network adapter 1820. As depicted, network adapter 1820 communicates with the components of the logical expression engine 102 via bus 1818. It should be understood that although not shown, other hardware and/or software components could be used in conjunction with computer system 1800. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to mitigate and provide alerts in real time from infected hosts that frequently change their domain names, as opposed to waiting for updated reputation feeds about newly recognized malicious domain names. The disclosed monitoring system is versatile, such that it can integrated with an existing monitoring system or provided as a standalone system, either of which can be deployed locally or cloud based.

The techniques described herein are exemplary and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A computer-implemented method for optimizing evaluation of a logical expression, the method comprising:
   receiving an original logical expression to be applied by a computer program for processing input information, the original logical expression having at least one operator and a subexpression;
   receiving statistics accumulated about how the computer program applies the subexpressions of the original logical expression for processing the input information received by the computer program;
   determining an average cost of evaluation of the logical expression by swapping left and right branches of the logical expression and recomputing the average cost by weighing string comparisons greater than numeric comparisons;
   using the accumulated statistics to optimize the order in which the subexpressions would be applied by the computer program; and
   outputting for application by the computer program an optimized logical expression having the subexpressions ordered in accordance with the optimized order.

2. The method of claim 1, wherein the logical expression is a regular expression.

3. The method of claim 1, wherein the statistics include a match counter associated with each subexpression that has been incremented each time the associated subexpression is matched by the incoming information, wherein using the accumulated statistics to optimize the order further comprises sorting the plurality of subexpressions as a function of their associated match counters.

4. The method of claim 3, further comprising providing a graphical user interface (GUI) that outputs for display the plurality of subexpressions and their associated match counters during application of the logical expression to the computer program while processing the input information in real time.

5. The method of claim 4, wherein the GUI further graphically indicates at least one of subexpressions that have an associated match counter equal to zero, subexpressions that have an associated match counter with a relatively low match counter, and subexpressions that have an associated match counter with a relatively high match counter.

6. The method of claim 1, wherein the input information is network traffic of a network, the original and optimized logical expressions are filters for filtering the network traffic, and the optimized logical expression is output in real time during network operation as the filter is applied to the network traffic.

7. The method of claim 6, wherein the input information is selected from at least one of streaming data and stored data, and the input information includes at least one of text, image, audio, video, numeric, and graphical data.

8. The method of claim 1, wherein optimizing the order in which the subexpressions would be applied by the computer program is further a function of cost of comparison for evaluating the subexpressions.

9. The method of claim 1, wherein optimizing the order in which the subexpressions would be applied by the computer program is further a function of, in association with each subexpression, a type of related operator to which the subexpressions is related, a number of times the subexpression was evaluated, a cost of evaluating the subexpression, a weighted cost associated with the subexpression, and a side of the related operator to which the subexpression is disposed.

10. The method of claim 1, further comprising providing a user interface that outputs for display the original logical expression and the optimized logical expression.

11. The method of claim 1, wherein the computer program applies a logical application as a filter.

12. The method of claim 1, further comprising:
determining a plurality of subexpressions included in the original logical expression;
applying the original logical expression to the computer program for processing the input information; and
accumulating statistics on the number of times each subexpression is evaluated and the number of times the subexpression matches the input information.

13. The method of claim 12, wherein sorting the plurality of subexpressions is performed periodically or continually during application of the original logical expression to the computer program for processing the input information in real time.

14. The method of claim 12, wherein accumulating the statistics includes:
associating a match counter to each subexpression; and
each time the subexpression of the plurality of subexpressions is matched, further incrementing a match counter associated with that subexpression.

15. The method of claim 14, wherein incrementing the match counter is performed periodically or continually during application of the original logical expression to the computer program for processing the input information in real time.

16. The method of claim 12, wherein accumulating the statistics includes determining at least one of a type of related operator to which the subexpressions is related, a number of times the subexpression was evaluated, a cost of evaluating the subexpression, a weighted cost associated with the subexpression, and a side of the related operator to which the subexpression is disposed.

17. A logical expression engine for optimizing a filter, the logical expression engine comprising:
a memory configured to store instructions;
a processor disposed in communication with said memory, wherein said processor upon execution of the instructions is configured to:
receive an original logical expression to be applied by a computer program for processing input information, the original logical expression having at least one operator and a subexpression;
receive statistics accumulated about how the computer program applies the subexpressions of the original logical expression for processing the input information received by the computer program;
determine an average cost of evaluation of the logical expression by swapping left and right branches of the logical expression and recomputing the average cost by weighing string comparisons greater than numeric comparisons;
use the accumulated statistics to optimize the order in which the subexpressions would be applied by the computer program; and
output for application by the computer program an optimized logical expression having the subexpressions ordered in accordance with the optimized order.

18. The logical expression engine of claim 17, wherein the statistics include a match counter associated with each subexpression that has been incremented each time the associated subexpression is matched by the incoming information, wherein using the accumulated statistics to optimize the order further comprises:
sorting the plurality of subexpressions as a function of their associated match counters.

19. A computer-implemented method for analyzing evaluation of a logical expression, the method comprising:
receiving input information;
determining a plurality of subexpressions included in an original logical expression to be applied for processing the input information, the original logical expression having at least one operator and a subexpression;
applying an original logical expression to an application for processing the input information;
determining an average cost of evaluation of the logical expression by swapping left and right branches of the logical expression and recomputing the average cost by weighing string comparisons greater than numeric comparisons;
accumulating statistics about how the application applies the subexpressions of the original logical expression for processing the input information;
submitting the statistics and the original expression to an optimizer for generation of an optimized logical expression that is an optimization of the original expression as a function of the statistics; and
applying the optimized logical expression to the input information.

* * * * *